US010698792B2

(12) United States Patent
Nelson et al.

(10) Patent No.: US 10,698,792 B2
(45) Date of Patent: Jun. 30, 2020

(54) EXECUTION CONTROL WITH CROSS-LEVEL TRACE MAPPING

(71) Applicant: Microsoft Technology Licensing, LLC, Redmond, WA (US)

(72) Inventors: Patrick Nelson, Redmond, WA (US); Jackson Davis, Carnation, WA (US); Del Myers, Seattle, WA (US); Thomas Lai, Redmond, WA (US); Deborah Chen, Seattle, WA (US); Jordi Mola, Bellevue, WA (US); Noah Falk, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 244 days.

(21) Appl. No.: 15/969,721

(22) Filed: May 2, 2018

(65) Prior Publication Data
US 2019/0340103 A1     Nov. 7, 2019

(51) Int. Cl.
*G06F 11/36*     (2006.01)
(52) U.S. Cl.
CPC ...... *G06F 11/3636* (2013.01); *G06F 11/3624* (2013.01); *G06F 11/3664* (2013.01)
(58) Field of Classification Search
CPC ............. G06F 11/3624; G06F 11/3636; G06F 11/3664
USPC ................................................ 717/124–135
See application file for complete search history.

(56) References Cited

U.S. PATENT DOCUMENTS

| 6,665,688 | B1* | 12/2003 | Callahan, II ........ G06F 16/2322 |
| 9,875,173 | B2 | 1/2018 | Marron et al. |
| 9,916,232 | B2 | 3/2018 | Voccio et al. |
| 2006/0046854 | A1 | 3/2006 | Arevalo Baeza et al. |
| 2006/0277527 | A1 | 12/2006 | Davis et al. |
| 2007/0294679 | A1 | 12/2007 | Bobrovsky et al. |

(Continued)

OTHER PUBLICATIONS

"What is the purpose of a Data Access Layer?", retrieved from <<https://stackoverflow.com/questions/59942/what-is-the-purpose-of-a-data-access-layer>>, Nov. 21, 2010, 4 pages.

(Continued)

*Primary Examiner* — Qing Chen
(74) *Attorney, Agent, or Firm* — Workman Nydegger

(57) ABSTRACT

Described technologies aid execution control during replays of traced program behavior. Cross-level mapping correlates source code, an intermediate representation, and native instructions in a trace. The trace includes a record of native code instructions which were executed by a runtime-managed program. The trace does not include any executing instance of the runtime. Breakpoints are set to align trace locations with source code expressions or statements, and to skip over garbage collection and other code unlikely to interest a developer. A live debugging environment is adapted to support trace-based reverse execution. An execution controller in a debugger or other tool may utilize breakpoint ranges, cross-level mappings, backward step-out support, and other items to control a replay execution of the trace. Aspects of familiar compilers or familiar runtimes may be re-purposed for innovative execution control which replays previously generated native code, as opposed to their established purpose of generating native code.

20 Claims, 7 Drawing Sheets

(56) References Cited

U.S. PATENT DOCUMENTS

| | | |
|---|---|---|
| 2008/0127054 A1 | 5/2008 | Stubbs et al. |
| 2008/0127055 A1 | 5/2008 | Davis et al. |
| 2009/0089764 A1 | 4/2009 | Lai et al. |
| 2009/0113251 A1 | 4/2009 | Goossen et al. |
| 2011/0145662 A1 | 6/2011 | Yuan et al. |
| 2012/0304156 A1 | 11/2012 | Feiveson et al. |
| 2012/0331351 A1 | 12/2012 | Davis et al. |
| 2013/0219369 A1 | 8/2013 | Rector et al. |
| 2014/0040897 A1 | 2/2014 | Davis et al. |
| 2014/0380102 A1 | 12/2014 | Lindo et al. |
| 2015/0127991 A1 | 5/2015 | Davis et al. |
| 2015/0135194 A1 | 5/2015 | Alvarez Cavazos et al. |
| 2015/0143344 A1 | 5/2015 | Davis |
| 2015/0161397 A1 | 6/2015 | Cook et al. |
| 2015/0199259 A1 | 7/2015 | Paveza et al. |
| 2015/0199261 A1 | 7/2015 | Paveza et al. |
| 2015/0347269 A1 | 12/2015 | Nelson et al. |
| 2015/0347274 A1 | 12/2015 | Taylor et al. |
| 2015/0378870 A1 | 12/2015 | Marron et al. |
| 2016/0124834 A1 | 5/2016 | Davis et al. |
| 2016/0239357 A1 | 8/2016 | Davis et al. |
| 2017/0277616 A1* | 9/2017 | Topiwala .............. G06F 11/364 |
| 2017/0300400 A1 | 10/2017 | Davis |
| 2018/0060213 A1 | 3/2018 | Mola |
| 2018/0060214 A1* | 3/2018 | Mola ..................... G06F 11/00 |
| 2018/0060215 A1 | 3/2018 | Mola |
| 2018/0113788 A1* | 4/2018 | Mola ................... G06F 11/3636 |
| 2018/0113789 A1* | 4/2018 | Mola ................... G06F 11/3636 |
| 2018/0173611 A1* | 6/2018 | Mola ................... G06F 11/3636 |
| 2018/0217768 A1* | 8/2018 | Mola ..................... G06F 11/362 |
| 2018/0260302 A1* | 9/2018 | Mola ....................... G06F 16/43 |
| 2019/0004930 A1* | 1/2019 | Mola ................... G06F 11/3409 |
| 2019/0012255 A1* | 1/2019 | Mola ................... G06F 11/3636 |
| 2019/0042390 A1* | 2/2019 | Mola ................... G06F 11/3604 |
| 2019/0324891 A1* | 10/2019 | Mola ................... G06F 11/3636 |
| 2019/0324892 A1* | 10/2019 | Gabryjelski ......... G06F 11/3636 |
| 2019/0332519 A1* | 10/2019 | Myers ................. G06F 11/3093 |

OTHER PUBLICATIONS

"Data access layer", retrieved from <<https://en.wikipedia.org/wiki/Data_access_layer>>, Aug. 21, 2017, 2 pages.

"Elm Debugger", retrieved from <<http://debug.elm-lang.org/>>, copyright 2014, 4 pages.

"Microsoft/PTVS", retrieved from <<https://github.com/Microsoft/PTVS>>, no later than Mar. 1, 2018, 2 pages.

"How does reverse debugging work?", retrieved from <<https://stackoverflow.com/questions/1470434/how-does-reverse-debugging-work>>, Sep. 24, 2009, 5 pages.

Bhansali, et al., "Framework for Instruction-level Tracing and Analysis of Program Executions", retrieved from <<http://static.usenix.org/events/vee06/full_papers/p154-bhansali.pdf>>, 2006, 10 pages.

Mußler, et al., "A Generic Binary Instrumenter and Heuristics to Select Relevant Instrumentation Points", retrieved from <<http://juser.fz-juelich.de/record/12504/files/J%C2%A9%C6%A1l_4335_Mu%C2%A9ler.pdf>>, Nov. 2010, 110 pages.

"Time Travel Debugging—Record a trace", retrieved from <<https://docs.microsoft.com/en-us/windows-hardware/drivers/debugger/time-travel-debugging-record>>, Sep. 22, 2017, 5 pages.

"Microsoft/PTVS", retrieved from <<https://github.com/Microsoft/PTVS/tree/master/Python/Product/Debugger.Concord>>, no later than Mar. 1, 2018, 1 page.

Cabral, et al., "RAIL: code instrumentation for .NET", retrieved from <<https://www.researchgate.net/publication/221001208_RAIL_code_instrumentation_for_NET>>, Jan. 2005, 7 pages.

"RevDeBug", retrieved from <<https://www.revdebug.com/>>, no later than Mar. 1, 2018, 7 pages.

"RevDeBug Tutorial", retrieved from <<https://revdebug.com/doc/tutorial/2.5.0.0/Selectiverecording-Whitelisting>>, no later than Mar. 1, 2018, 6 pages.

"Reverse/'Time Traveling' Debuggers for Javascript", retrieved from <<https://stackoverflow.com/questions/21841808/reverse-time-traveling-debuggers-for-javascript>>, Feb. 18, 2014, 1 page.

"Rider", retrieved from <<https://www.jetbrains.com/rider/>>, no later than Mar. 1, 2018, 4 pages.

Tamches, et al., "Fine-Grained Dynamic Instrumentation of Commodity Operating System Kernels", retrieved from <<http://pages.cs.wisc.edu/~paradyn/ParadynWeek/1999-notes/tamches.pdf>>, 1999, 24 pages.

"Reverse debugging, time travel debugging", retrieved from <<https://undo.io/resources/whitepapers/reverse-debugging-whitepaper/>>, no later than Mar. 1, 2018, 10 pages.

JamesP, "Time Travel Debugging in WinDbg Preview!", retrieved from <<https://blogs.msdn.microsoft.com/windbg/2017/09/25/time-travel-debugging-in-windbg-preview/>>, Sep. 25, 2017, 35 pages.

"Tracing_(software)", retrieved from <<https://en.wikipedia.org/wiki/Tracing_(software)>>, Aug. 30, 2017, 4 pages.

"UndoDB", retrieved from <<https://undo.io/products/undodb/>>, no later than Mar. 1, 2018, 7 pages.

"What is the principle of 'Time Travel Debugger'?", retrieved from <<https://stackoverflow.com/questions/42104003/what-is-the-principle-of-time-travel-debugger>>, Oct. 8, 2017, 3 pages.

BValzer, "EXDAMS—Extendable Debugging and Monitoring System", retrieved from <<http://www.dtic.mil/dtic/tr/fulltext/u2/686373.pdf>>, 1969, 40 pages.

Coetzee, "Combining reverse debugging and live programming towards visual thinking in computer programming", retrieved via <<http://scholar.sun.ac.za/handle/10019.1/96853>>, Mar. 2015, 105 pages.

"International Search Report Issued in PCT Application No. PCT/US19/029028", dated Sep. 23, 2019, 13 Pages.

* cited by examiner

EXECUTION CONTROL WITH CROSS-LEVEL TRACE MAPPING

BACKGROUND

Computer software is often complex. Part of the complexity may arise from the nature of the work a program is designed to perform, e.g., tracking large numbers of real world items or ongoing transactions over hours or longer periods of time, coordinating activities with other complex software, controlling complex hardware, and so on. In almost any real-world use of software, complexity also arises because many details are introduced and should be correctly managed in order to instruct computer hardware how to perform real-world work that is initially described much less precisely in English or another natural language. That is, the transformation from a high-level description to a low-level implementation which is executable by a computer system, inevitably introduces complexity. Even programming language source code, which is more precise than natural languages, is still at a relatively high level and therefore is ambiguous, being open to various understandings and implementations. Source code is transformed into low-level instructions that can be directly executed by computational hardware, with many details being introduced and choices being made during that transformation.

Complexity introduces the all-too-often realized possibility of programming errors, a.k.a. "bugs". The process of identifying the cause of a bug and attempting to modify a program to remediate or remove the bug's impact is referred to as "debugging". Specialized software tools which assist debugging are called "debuggers". The program being debugged is called the "debuggee".

Debugging is perhaps easiest when a developer can run the debuggee slowly, or at full speed, or pause execution of the debuggee, all at will, and can examine all state information of the debuggee at any point in the debuggee's execution. This is known as "live process debugging". However, such full access to a debuggee is often not available. For example, the debuggee may be production software that cannot be debugged live without violating service agreements or harming the reputation, security, or finances of an interested party. Unacceptable harms may occur if the live process debuggee is paused for seconds at a time while the developer examines variable values, checks to see which functions were called with which parameter values, reviews the source code, considers possible explanations for the bug, and devises tests that might help identify, remediate, or eliminate the bug.

Accordingly, sometimes state information is recorded as the debuggee executes, to be examined later without substantially pausing the debuggee's execution. Creating such a recording may slow down the debuggee, but the recording may provide helpful information without hurting production performance targets the way live debugging could. For instance, the debuggee may be paused just long enough to create a memory dump which copies to disk some or all of the memory values pertinent to the debugger at a particular point in time. Some aspects of the debuggee's execution may also be recorded in an execution trace. Some debuggers support use of such a trace to replay the execution of the traced debuggee, without the debuggee being a live process. With some debuggers, the debuggee execution can be replayed in forward or in reverse, thus permitting "time travel", "reverse", or "historic" debugging.

However, because an execution trace may contain less information than is sometimes available during live process debugging, and because the execution trace records state information at a low level, technical challenges arise when a debugger or other software tool attempts to control replay execution, namely, execution that is based on the recorded trace. Depending on the implementation, execution control operations that are familiar to developers and are often used during live debugging may be less accurate when attempted during a trace-based replay, or may not be available at all.

Accordingly, advances in efficiently and accurately implementing high-level execution control using a low-level execution trace could help improve the information that is available to developers or to automated performance monitoring tools, through a debugger or another replay or logging tool. Thus, such advances will tend to improve the function of computer systems by facilitating an accurate understanding of computer system behavior, and by promoting the mitigation or eradication of computer system bugs.

SUMMARY

Some technologies described herein are directed to the technical activity of mapping between locations in a program's source code and corresponding locations in a trace of the program's execution, thereby improving the accuracy of execution control in trace-based debugging. Some teachings are directed to specific breakpoint setting procedures which set one or more breakpoints at locations that align with source code expressions or statements. Technical mechanisms are described for adapting a live debugging environment to support trace-based reverse execution. Specific technical tools and techniques are described here in response to the challenge of replaying debuggee execution, in forward or reverse or both, based on an execution trace. Other technical activities pertinent to teachings herein will also become apparent to those of skill in the art.

Some embodiments described herein use or provide trace replay execution control capabilities using a processor, a memory, a trace recorded during an execution of a program which uses a runtime, program source code, mappings between the source code and its intermediate representation and the trace, and an execution controller in a debugger or other tool. The runtime includes support code which provided dynamic compilation or memory garbage collection services as the traced program executed and the trace was captured. The trace may include a record of native code instructions which were executed by the program. The trace may include a record of data that was accessed during execution of the program while the debuggee was executing. The trace may include one or more memory dumps or snapshots. The trace may be stored in one or more files or portions of non-volatile or volatile memory. The execution controller is configured to control a replay execution of the trace in response to requests from the tool. During replay, the source code is correlated with the trace native code instructions or other trace entries through the source-intermediate mapping and the intermediate-native mapping, using breakpoints which are set to help align grouped native instructions with their corresponding respective source code items.

Some embodiments described herein use or perform computer-implemented trace replay execution control. A traced managed program is identified. A managed program, also referred to as a "runtime-managed" program, is a program configured to execute in conjunction with calls into a runtime. A traced managed program is one that is traced, or configured to be traced. A trace replay execution control request is received in a software tool. Based on the trace replay execution control request, a mapping is followed between a source code of the traced managed program and an intermediate representation of the source code, and another mapping is followed between the intermediate representation and a trace. The trace does not include any executing instance of the runtime. Replay of the trace can be controlled, for example, by emulating traced activity in a direction and amount that corresponds to the trace replay execution control request (e.g., take one step forward, or repeat an entire routine by stepping over it), or by setting a breakpoint on a trace location, or by doing both.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope. Although dashed lines indicate that some items are optional, any item which is recited in a claim or is considered by one of skill in the art as non-optional for embodying a claim is understood to be present in some form in an embodiment of the claim.

DETAILED DESCRIPTION

Overview

Figure 1:
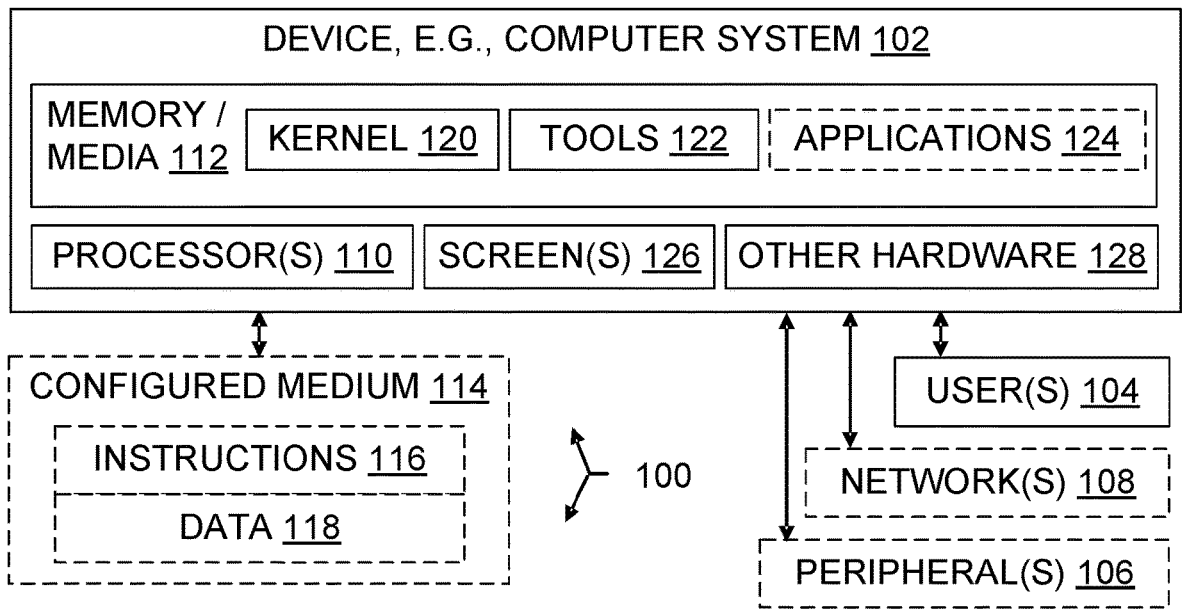
FIG. 1 is a block diagram illustrating a computer system and also illustrating a configured storage medium.

Debugging in a production cloud environment poses serious technical challenges. For example, suppose a particular request R to an online shopping cart is not working. How can a developer debug the processing of request R without slowing down the processing of all the other requests and with a minimal slowdown in the processing of request R? To find the bug, the developer uses information about what is happening inside the code, e.g., a way to see the values of variables at one or more points of interest during the processing of request R.

Trace-based debugging innovations discussed here help overcome technical challenges left unresolved by conventional approaches. For instance, many conventional debuggers and debugging methods allow a developer to set halt breakpoints to get information about variable values. Halt breakpoints are instructions that halt execution so the developer has time to examine memory contents at a given point in the processing and consider possible explanations for what is observed. But in a production environment, a halt breakpoint could halt the processing of numerous requests, or cause requests to fail entirely (e.g., timeout), or cause execution to take a different execution path, each of which is undesirable. Even halting only a single thread may result in an undesirably abandoned request and have unforeseen side-effects that hinder debugging, or reduce performance, or both.

Some familiar debugging approaches involve adding print statements to print the value of particular variables at particular points in the code, or adding other code, e.g., to test the value of a variable to see whether it is what the developer expects it to be at that point in the code. But these approaches may require recompiling and redeploying code, which is not favored in a production environment, particularly if recompiling and redeploying are to be done multiple times as part of an iterative debugging process to find and fix a single bug.

The developer could inject an operation into the request processing code at execution time to make a copy of part or all of the memory pertaining to the request. The copy may include a "snapshot" 304 (an in-memory copy of a process that shares memory allocation pages with the original process via copy-on-write) or a "dump" file 302 (a serialized copy of the process), or both. Some conventional debuggers can read a dump file or a snapshot and, given appropriate metadata, can present memory content in a format that shows variable values translated from binary into informative structures that include variable names and that display variable values based on the respective data types of the variables. But dumping memory to a file takes significant time, which slows down the processing of all requests in the example scenario, not merely request R. Even though taking a snapshot is much faster than creating a dump file, it may take a developer many attempts to find a useful point in the processing to take the memory snapshot that is reveals the bug, and snapshots consume space in RAM. To get a view of the memory at another point in time than the execution time captured in a dump file or a snapshot, another memory copy could be created.

To get a view of the memory at any point in time from a live process, the live process is used. In many modern computing systems, as illustrated in the FIG. 2 example, the live process 202 includes a runtime 204 in addition to relying on an operating system 120. The runtime 204 provides garbage collection or dynamic code compilation (i.e, JIT compilation or compilation of intermediate language code) or both. Garbage collection may utilize object reachability analysis, object reference counting, or other strategies. Some configurations include interpreted runtimes 204, and one of skill will acknowledge that teachings herein can be applied to perform execution control on an interpreted runtime by super-imposing the interpreter's view onto the native trace and using breakpoints within the interpreter itself. Additionally, some runtimes (e.g., Java® runtimes) don't always JIT compile their IL representation (Java terminology calls it "bytecode"). Rather, the runtime may choose to interpret the bytecode for functions that are not often used. In such cases, the execution control may perform execution control of the runtime code itself, and it may map native code to internal runtime data structures to IL to source code. The native code to internal runtime data structures to IL mapping may be considered an example of intermediate-native mapping 812, and the IL to source code mapping may be considered an example of source-intermediate mapping 810.

Unlike processes that lack runtimes, which can be controlled directly by a debugger through insertion of halt breakpoints, processes that depend on a runtime cannot be directly controlled by a debugger 200 because their runtime effectively hides from the debugger details 206 such as memory locations, memory contents, and instruction pointers. To show the developer what is in the memory during debugging, the debugger sends the runtime a message 214 asking for current memory values, the runtime sends the values to the debugger in a reply message 216, and the debugger displays in some user interface 210 the values it received in the reply message.

As a particular example of the shortcomings of prior approaches, consider a runtime 204 which is implemented as a virtual machine that executes an intermediate language (IL). The IL code can't easily be debugged using a traditional native code debugger because the debugger will operate to debug the virtual machine/runtime rather than operating to debug the IL code.

The runtime also controls execution of a live debuggee. A traditional debugger for IL or the languages that compile to IL work by setting up a communication channel between the debugger and the runtime inside the debuggee. The runtime in the debuggee does a large share of the work required to provide the debugging experience. In one example, to set a breakpoint at an intermediate language (IL) instruction in method Foo, at offset 28, a message is sent to the runtime asking it to set a breakpoint at Foo, offset 28. Then a thread within the runtime will receive that message, translate Foo IL offset 28 into a machine instruction residing at memory address 0x4567123512395, and then write a breakpoint instruction at that location. Similarly, to perform familiar execution control operations such as step, step-in, step-out, and step-over, the debugger sends the runtime a message 214 requesting the operation, the runtime 204 performs the operation and sends an updated status to the debugger in a reply message 216, and the debugger displays in some user interface 210 the results indicated in the reply message.

The user interface 210 displays the debugger's representations of the debuggee program state to the user graphically. Some examples of program state are a list of threads, the next line of source code to execute on each thread, a call stack for each thread, a set of variables in each frame of the call stack, the values of those variables, and so on. The user interface may include windows which display local data of a routine, watched variables and their values, source code, an expression evaluator, and other information about the debuggee 202.

In some implementations, a runtime translating portion of the debugger 200 is responsible for translating between low-level concepts such as memory cells and registers, on the one hand, and the runtime abstractions, on the other. Examples of runtime abstractions include a list of threads, one or more callstacks for each thread, and the IL instruction that will be executed next. Note that a callstack at the runtime layer of abstraction is not necessarily the same as a callstack at the source code level of abstraction, e.g., the callstack of a virtual machine doesn't necessarily match the virtual callstack of the IL code being executed in the virtual machine.

It is possible to create an execution trace 418 of a process. The trace can then be replayed using emulation of the hardware 102. Sometimes this traced process is written in a high-level language 212 which requires the process 202 to be executed by a runtime framework 204. The trace itself may be difficult to debug because the trace data reflects a view at a low level (e.g., the runtime or just-in-time compiled code or both), rather than the high-level language the program was written in. Some tracing technologies don't provide the high-level view of a process that a developer 104 may well prefer. Most high-level runtimes require that the runtime itself provide information about programs running within its framework. Thus, conventional debugging may require the process to be executing within the runtime, which is not an option when debugging is based on a trace instead of a live process.

Like any other process, a runtime can be traced. However, debugging software other than a runtime is more common than debugging a runtime. Tracing a process may include or exclude tracing some or all code that is part of the runtime itself.

To control the execution of a live process that is executing code reliant on a runtime 204, the debugger may send the runtime a message requesting an operation such as "step" or "run", and then the runtime executes the operation on behalf of the debugger.

The functionality for a debugger to send a message to the runtime to execute an operation on behalf of the debugger does not work with a trace file that has no currently executing runtime. Dump files 302 and snapshots 304 are similar to traces in terms of the runtime being unavailable to use. The runtime may be represented in the dump or snapshot or trace, but it is not executing and thus cannot be called into in a traditional approach.

Nonetheless, trace files 420 can be made part of a debugging environment. Some trace-based debugging embodiments discussed here extend the power of debugging so that debuggers can replay execution from a trace file, starting at one or more points in execution time chosen by a developer, and moving either forward or backward through the traced execution in increments chosen by the developer. One approach inserts a replay layer between the trace and the high-level language debugger. The replay layer understands the runtime's execution control messages, which allows high-level control of the traced process.

In some situations, a developer can use a "time travel" debugger to control execution replay to run forward in execution time or backward in execution time when replaying a recorded trace 418, thereby leveraging the ability of a debugger to present program state information such as the instruction pointer(s) and memory in useful high-level (e.g., named and data type-based) variable presentations, not only for snapshots as before but also now for a continuous replay of a segment of execution time recorded during code execution. Debugging can be made more efficient by aligning grouped trace data with the corresponding source code constructs such as expressions and statements. Memory values captured in the trace can be inspected by the developer in a high-level presentation at multiple points, based on the low-level data recorded in the trace file.

A replay layer including can be utilized to control a debuggee state as the trace is replayed. Thus adapted, the debugger 200 can apply a runtime (high-level) view of a process trace that has been recorded as machine-level operations. For purposes of the present application only, "machine-level" operations are those specified at machine-specific level of detail. "Native" and "machine-level" are used interchangeably herein with respect to instructions or code generally.

Some embodiments described herein may be viewed by some people in a broader context. For instance, concepts such as controlling execution, recording execution, and replaying a recorded execution may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to automatically correlate high-level control requests with a machine-level trace, and other problems addressed herein. Other media, systems, and methods involving controlling execution, recording execution, or replaying a recorded execution are outside the present scope. Accordingly, vagueness, mere abstractness, lack of technical character, and accompanying proof problems are also avoided under a proper understanding of the present disclosure.

Technical Character

The technical character of embodiments described herein will be apparent to one of ordinary skill in the art, and will also be apparent in several ways to a wide range of attentive readers. Some embodiments address technical activities that are rooted in computing technology and improve the functioning of computing systems by helping debug those systems, thereby improving system uptime, system accuracy, and power utilization relative to computational results produced. For instance, some embodiments provide system debuggability functionality which helps reduce the amount of time spent by a developer to locate a bug explanation while debugging by allowing the replay execution to move backward to a desired point instead of restarting from the beginning of execution and moving forward to that point. Some embodiments improve system debuggability by accurately aligning trace data with corresponding source code statements. Some provide additional debugging functionality in a system such as functionality for setting a breakpoint address range in place of setting a breakpoint on one address at a time.

Some embodiments include technical components such as computing hardware which interacts with software in a manner beyond the typical interactions within a general purpose computer. For example, in addition to normal interaction such as memory allocation in general, memory reads and writes in general, instruction execution in general, and some sort of I/O, some embodiments described herein implement a backward step-out replay operation as disclosed herein.

Technical effects provided by some embodiments include more efficient use of debugging time, reduced re-tracing to obtain additional trace data, and improved debugger functionality for the exploration of bug causality.

Some embodiments include technical adaptations. Some include a replay layer adapter which accepts requests formatted for a runtime, that is, in a message format compatible with familiar debugger-runtime communications, and responds to those requests in a format that could be used by a runtime during live debugging. A replay adapter in some embodiments provides an interface that hides differences between live process debugging, dump-based debugging, and time travel trace-based debugging. Some embodiments include maps between source code, intermediate representation(s), and trace data.

Other advantages based on the technical characteristics of the teachings will also be apparent to one of skill from the description provided.

Acronyms and Abbreviations

Some acronyms and abbreviations are defined below. Others may be defined elsewhere herein or require no definition to be understood by one of skill.

ALU: arithmetic and logic unit
API: application program interface
BIOS: basic input/output system
CD: compact disc
CPU: central processing unit
DAC: data access component
DVD: digital versatile disk or digital video disc
FPGA: field-programmable gate array
FPU: floating point processing unit
GPU: graphical processing unit
GUI: graphical user interface
IDE: integrated development environment, sometimes also called "interactive development environment"
IL: intermediate language
OS: operating system
RAM: random access memory
ROM: read only memory Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, Internet of Things nodes, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include any sequence of instructions capable of or subject to scheduling (and possibly to synchronization), and may also be known by another name, such as "process," or "coroutine," for example. The threads may run in parallel, in sequence, or in a combination of parallel execution (e.g., multiprocessing) and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, and so on.

"Kernels" include operating systems, hypervisors, virtual machines, BIOS code, and similar hardware interface software.

"Code" means processor instructions, data (which includes constants, variables, and data structures), or both instructions and data. "Code" and "software" are used interchangeably herein. Executable code, interpreted code, and firmware are some examples of code. Code which is interpreted or compiled in order to execute is referred to as "source code".

"Program" is used broadly herein, to include applications, kernels, drivers, interrupt handlers, firmware, state machines, libraries, and other code written by programmers (who are also referred to as developers) and/or automatically generated.

"Service" means a consumable program offering in a cloud computing environment or other network environment.

"Execution time point" means a specific point of execution for a processing unit or thread, especially as relates to traced execution. References herein to a "particular execution time" or an "execution time t" or the like are references to an execution time point. An execution time point may be implemented as a timecode variable or timecode value, or as a relative position in a trace or other record of execution activity, for example. An execution time point ta being "prior to" or "later than" an execution time point tb implies that a relative ordering of the two execution time points is determined. Similarly, a "younger" execution time point is one that is later than an "older" execution time point.

Information in a trace about the ordering of traced events may be incomplete. Thus, a trace may have sufficient information to establish that an event A is prior to an event B, or to establish that an event D is later than an event C. But the relative order of events may also be partially or fully indeterminate, so far as the trace is concerned. The trace may show that event E is not after event F, but that does not necessarily imply E is before F; similarly, a trace may show that an event K is not before an event J without the trace also showing that K is after J. The trace may also lack sufficient information to establish any ordering of two particular events relative to one another.

"Timecode" means a monotonically changing value which can be used to impose an ordering on at least some events in an execution trace. It is expected that timecodes will often be monotonically increasing values, but timecodes could also be implemented as monotonically decreasing values. Some examples of timecodes include instruction counters, clock times (a.k.a. clock ticks), and entirely artificial (not based on a register or instruction) monotonic values. Depending on the trace, all or some or none of the traced events may have respective associated timecodes. When timecodes are present, they may be unique, or they may be merely monotonic because some timecode values are repeated.

"Memory cell" means an addressable unit of memory. Some examples include a byte or word in RAM or in ROM, a processor register, a cache line, and other addressable units of memory.

An "emulator" performs "emulation" which provides the same functionality as original hardware, but uses a different implementation or different hardware or both. One example is a CPU Emulator, which acts like a CPU and can be used to execute code like the original CPU hardware, but has a different implementation than the original CPU, e.g., the emulator may run on entirely different physical hardware.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that are not realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as searching trace data fast enough to permit replay within one or two orders of magnitude of the original execution speed, and computations to group native instructions of a trace and align the instruction groups with respective source code items, are understood herein as requiring and providing speed and accuracy that are not obtainable by human mental steps, in addition to their inherently digital nature (a human mind cannot interface directly with a trace file or other digital storage to retrieve the necessary trace data). This is well understood by persons of skill in the art, but others may sometimes benefit from being informed or reminded of the facts. Unless stated otherwise, embodiments are presumed to be capable of operating at scale in production environments, or in testing labs for production environments, as opposed to being mere thought experiments.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, is to be deemed part of the structures identified in the application for zac widgets and help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as aligning, clearing, compiling, continuing, controlling, debugging, emulating, encountering, exceeding, executing, getting, grouping, identifying, mapping, performing, receiving, recording, replaying, requesting, responding, sending, setting, specifying, stepping (and variations such as stepping-in, stepping-out, stepping-over), terminating, tracing (and aligns, aligned, clears, cleared, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, being mere energy, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se in the United States, and any claim interpretation that asserts otherwise is unreasonable on its face. Unless expressly stated otherwise in a claim granted outside the United States, a claim does not cover a signal per se.

Moreover, notwithstanding anything apparently to the contrary elsewhere herein, a clear distinction is to be understood between (a) computer readable storage media and computer readable memory, on the one hand, and (b) transmission media, also referred to as signal media or mere energy, on the other hand. A transmission medium is a propagating signal or a carrier wave computer readable medium or mere energy. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly described is unnecessary for one of skill in the art, and contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination is contrary to policies calling for patent specifications to be concise and for readers to be knowledgeable in the technical fields concerned.

LIST OF REFERENCE NUMERALS

Figure 4:
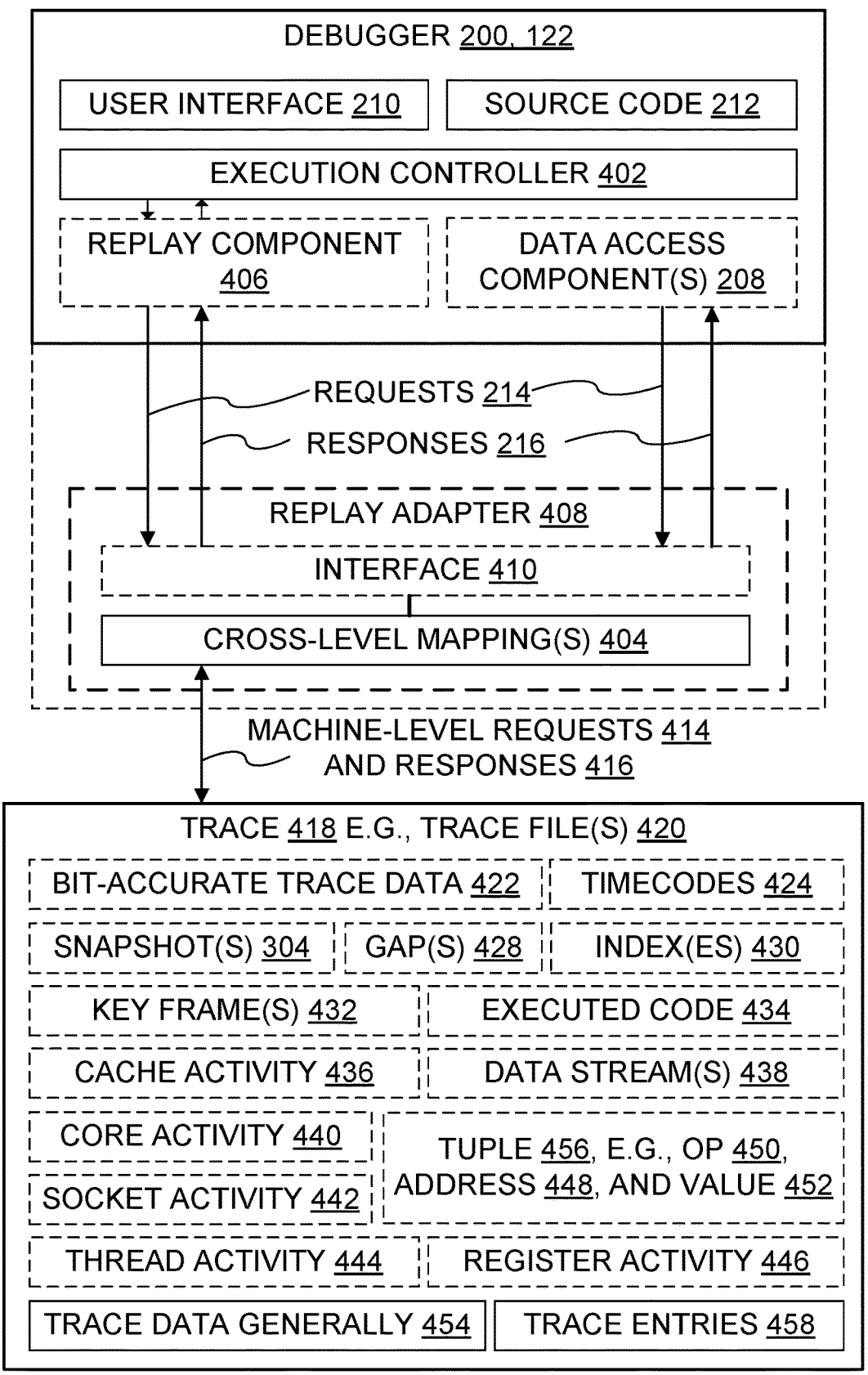
FIG. 4 is a block diagram illustrating aspects of an example architecture for trace-based debugging, including primary requests and responses between a debugger and a replay adapter.

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 operating environment, also referred to as computing environment
- 102 computer system, also referred to as computational system or computing system
- 104 users
- 106 peripherals
- 108 network generally
- 110 processor
- 112 computer-readable storage medium, e.g., RAM, hard disks
- 114 removable configured computer-readable storage medium
- 116 instructions executable with processor; may be on removable media or in other memory (volatile or non-volatile or both)
- 118 data
- 120 kernel(s), e.g., operating system(s), BIOS, device drivers
- 122 tools, e.g., anti-virus software, profilers, debuggers, editors, compilers, interpreters, security penetration testers, fuzzers, automated performance monitoring tools, etc.; may be adapted to use execution control as taught herein
- 124 applications, e.g., word processors, web browsers, spreadsheets
- 126 display screens
- 128 computing hardware not otherwise associated with a reference number 106, 108, 110, 112, 114
- 200 debugger, also refers to the activity of debugging
- 202 live debuggee program or process
- 204 runtime, e.g., Common Language Runtime, Java® virtual machine or other virtual machine that translates code dynamically for execution (mark of Oracle America, Inc.)
- 206 memory items, e.g., application or system data structures
- 208 data access component of debugger
- 210 user interface of debugger
- 212 source code, related information such as meta data and symbol table
- 214 primary request from debugger to debuggee information source, e.g., live debuggee or dump file reader software or snapshot reader software or trace file reader software
- 216 response to primary request that sought information from debuggee information source or state change; also referred to as "primary response" as in a response at the abstraction level of a primary request, not as in first or initial or most important response
- 218 statement in source code; may be delimited expressly, e.g., by semi-colon or parentheses, braces, or brackets, or may be implicitly delimited by white space or by end-of-line
- 220 expression in source code; defined syntactically by the programming language used; may be an assignment of a function call, an assignment of an object member, a routine call, or another combination of constants, variables, operators, and routines that produces a resulting value or side-effect
- 302 dump file, a.k.a. memory dump; may include additional information such as indexes or metadata
- 304 memory snapshot; may include additional information such as indexes or metadata
- 402 debuggee execution control code in debugger, e.g., to request or emulate execution control over debuggee such as stepping through debuggee, setting a breakpoint, executing the debuggee until a breakpoint is reached, etc.
- 404 cross-level mappings in a debugger or other tool, e.g., a mapping between source code and an intermediate representation or a mapping between an intermediate representation and trace data
- 406 replay component which emulates debuggee execution using a trace file; alone or with other replay layer components 402, 408 (depending on the implementation), the trace replay component 406 emulates execution of the original process using the trace and allows viewing CPU state and memory cells over time; this emulation can proceed forwards or backwards in some embodiments
- 408 replay adapter for a replay component, which allows the replay component to send requests and receive responses that are also used during the debugging of a live process; in a trace file debugging scenario the replay layer (i.e., replay component plus replay adapter) receives and responds to primary requests from a debugger that may be received and responded to by a runtime in a live process debugging scenario, and the replay adapter also makes secondary requests to the trace file
- 410 replay adapter interface; configured for communications with debugger
- 414 secondary request from replay adapter to trace, where "secondary" indicates a lower level of abstraction than the primary request 214 level of abstraction; this secondary request may be a machine-level request that may be implemented as a communication to a trace file reader or may be implemented internally (e.g., as a function call) within the replay adapter
- 416 response to machine-level request that sought information from trace; also referred to as "secondary response" as in a response at the abstraction level of a secondary request, not as in second response; may be implemented as a communication from a trace file reader or may be implemented internally (e.g., as function results or data structure updates) within the replay adapter
- 418 execution trace; although dashed lines in FIG. 4 show that individual items may be included in or omitted from a given trace, it is assumed herein that the trace is not empty and therefore the box for trace data generally 454 shows a solid line; 418 may also refer to the activity of creating a trace, which is sometimes called "tracing" or "recording"

420 trace file containing execution trace data; may include machine-level trace data, namely, data which records execution activity at the level of native code
422 bit-accurate trace data in a trace
424 timecodes in a trace identifying particular execution time points in the execution of traced code; may be linked to or embedded within other data inside a trace, e.g., in trace data that expressly states an execution time point associated with a stated operation at a stated memory address involving a stated data value; timecodes may be implemented, e.g., as clock ticks or instruction counters; some traces may contain a unique timecode for each recorded operation, but timecodes may also be repeated or omitted in some trace data
428 gap in timecodes in trace to indicate expressly or implicitly execution time points where tracing was not performed (e.g., ranges when tracing was disabled for a thread or processing unit). This may include any gap where adjacent timecodes differ by more than the default or specified increment (normally one), e.g., the timecode sequence 2, 3, 4, 300, 301, 302 has a gap between 4 and 300, and the timecode sequence 250, 500, 750, 1000, 2000, 2250, 2500 has a gap between 1000 and 2000.
430 index into data in trace file, e.g., reverse-lookup data structures for quickly identifying trace attributes, memory lifetime indexing information, and other searchable lists of locations in the trace data that may be of particular interest
432 key frames in trace data; e.g., may exist at regular intervals in trace data to permit replay to more quickly jump to replay of the trace at (or near) the key frame
434 executed code, e.g., opcodes and arguments of machine-level code of a debuggee that was executed by a processor as the debuggee ran and was being traced
436 stack activity that occurred as the debuggee ran and was being traced, e.g., stack growth, stack shrinkage, and the execution time points at which this activity occurred
438 data streams; may correspond to an individual thread or set of threads, may correspond to a processor unit (e.g., a processor core); may correspond to all cores in a given processor socket; may be annotated with metadata to aid replay
440 processor core activity that occurred as the debuggee ran and was being traced, e.g., opcodes and arguments of instructions executed by the core
442 processor socket activity that occurred as the debuggee ran and was being traced, e.g., opcodes and arguments of instructions executed by any core located in a given processor socket
444 thread activity that occurred as the debuggee ran and was being traced, e.g., instructions executed while the thread was running, memory cell accesses made while the thread was running, associated metadata such as thread ID and timecodes
446 register activity that occurred as the debuggee ran and was being traced, e.g., what value was read from which register at what timecode, what value was written to which register at what timecode
448 memory address
450 instruction op code
452 data value
454 trace data generally
456 tuple, namely, two or more items of trace data which are associated in the trace as representing the same operation during the traced execution; e.g., a memory read operation or a memory write operation may be recorded on a single line in a trace as a tuple which contains or otherwise associates together an op code (e.g., read or write), an address (e.g., a RAM address or register ID), and the data value that was read or written
458 trace entry
502 memory cell, e.g., byte or word in RAM or in ROM, processor register, cache line, or other addressable unit of memory
504 stack, e.g., a portion of memory where state information is pushed when a routine is entered and then popped as control returns from the routine to the code that called the routine; often distinguished from heap memory
506 stack base address which defines a starting point from which stack is allocated in contiguous pieces of memory; stacks are assumed to grow in a known direction by allocation of stack memory in a system, which may be an upward direction (i.e., addresses increase as items are pushed on the stack) in a given system but may also be downward (i.e., addresses decrease as items are pushed on the stack) in another system; the term "growthward" herein means in the direction of stack growth on the system in question, and "shrinkward" means in the opposite direction
508 stack frame, a.k.a. allocation record, which is allocated on the stack when a routine is called; typically contains a return address identifying a location in the code where execution will resume when the routine returns; may also hold values passed as parameters to the routine when the routine is called, or the address of such parameter values
510 heap memory which is allocated and deallocated as objects are constructed and freed; in some cases, a heap may be subject to automatic garbage collection, which identifies and marks as available memory that hold objects no longer reachable during live execution of a process; in other cases, memory allocated from a heap requires a separate, explicit call to free that allocated memory.
512 object
514 cache memory; may be in RAM working memory or onboard a processor chip, for example
516 register in a processor core
518 object property; a named value which is a constituent of an object; may be a function, in which case the property is often referred to as a method; also refers to function that implements an object property
520 ROM (read-only memory); typically non-volatile
522 nonvolatile memory other than onboard ROM, such as removable flash memory, magnetic or optical disk storage, tape storage, etc.
524 RAM (random access memory); typically volatile
526 local memory, e.g., memory which is local to a stated or implied context such as local to a routine during the routine's execution and then freed, or local to a thread
528 global memory, e.g., memory which is global to a stated or implied context such as global to a set of multiple routines during the execution of any of them, or global to a set of threads
530 characteristic of memory which increases or decreases likelihood that an entity external to a thread will alter the value stored in the memory cell, e.g., whether the memory cell is write-protected with respect to other threads, whether it is in shared memory such as memory that is global to multiple threads 602 memory cell specification, e.g., an address in ROM or RAM or cache, or a register ID, or another item that specifies a memory cell by distinguishing it from other memory cells to permit access (read or write, or reasonable attempt to read or write) to that memory cell; may also specify multiple memory cells, e.g., as a range of addresses 604 register ID, e.g., register name, or index into an array of registers 606 address range, namely, a set of adjacent addresses identifying a corresponding set of contiguous memory cells; as an example, a range may be specified as a pair of addresses (high address and low address); as another example, a range may be specified as a base address and a count of contiguous cells based on the base address 608 specification of one or more execution time points, e.g., as a particular timecode, or a range of timecodes; a range may be specified as a pair of timecodes (start timecode and end timecode) or a range may be specified as a base timecode and a count of timecode increments such as a number of clock ticks or a number of instructions 610 instruction count, usable as a timecode; may be an absolute count from when a process began execution or a relative count such as from when a thread resumed execution 612 system clock value, e.g., in milliseconds or CPU cycles 614 execution time range specification, i.e., data which specifies a range of execution time points; may be implemented, e.g., as a pair of timecodes (start and end) or as a base timecode and a count of timecode increments based on the base timecode 616 execution time point 618 execution control operation, e.g., forward step, reverse step-over, goto specified location, set or clear breakpoint, and others 620 identifier of execution control operation; for stepping or continuing operations this references or includes a direction (i.e., forward or backward; "reverse" and "backward" are used interchangeably herein) and also references or includes an increment size (e.g., one step, step-over a routine, or continue until a breakpoint is encountered)

702 data values derived from trace data 704 instruction pointer identifying a particular instruction or execution time point in the trace data; this is the reference location from which replay execution moves forward or backward; "backward" means in the direction of increasingly younger execution time points and "forward" means in the direction of increasingly older execution time points 706 status code indicating result of request, e.g., execution control operation succeeded, execution control operation initiated (for asynchronous controls), execution control operation failed 800 trace replay execution control system 802 process of a traced program; may include one or more threads 804 thread 806 request from a user to a tool for an execution control operation 808 program metadata or tool metadata, e.g., data not otherwise specifically numbered but nonetheless discussed herein 810 source-intermediate mapping, namely, mapping between source code or source code item(s) and one or more intermediate representations of the source code or source code item(s); mapping 810 is an example of a cross-level mapping 404

812 intermediate-native mapping, namely, mapping between one or more intermediate representations and native instructions or other trace data; mapping 812 is an example of a cross-level mapping 404

814 record of native instructions 116 in trace; may include, e.g., bit-accurate trace data 422, executed code 434, tuples 456, or other trace data 454

816 JIT (just-in-time) compiler 818 call to a routine or other invocation, e.g., transfer of control to an exception handler or an interrupt handler 820 return address, namely, where execution time point or instruction at which execution will continue after a call 818

822 group of trace data, such as native instructions, which corresponds to a particular source code statement S or source code expression E; for example, this may include a record of the execution of instructions which were all produced by compiling the source code statement S or source code expression E and not produced from compilation of the source code statements and source code expressions adjacent to S or E 824 an edge instruction of a group 822; each group generally has two edges—if the instructions are ordered then one edge is the youngest instruction in the group and the other edge is the oldest instruction in the group; regardless of whether all instructions of a group are ordered relative to one another, an instruction X of a group of instructions G in a trace is on an edge of G when X satisfies at least one of the following conditions: X is the first instruction of G encountered during forward execution of the trace ("first forward edge"), X is the last instruction of G encountered during forward execution of the trace ("last forward edge"), X is the first instruction of G encountered during backward execution of the trace ("first backward edge"), or X is the last instruction of G encountered during backward execution of the trace ("last backward edge")

826 intermediate representation, e.g., lower level code such as intermediate language code, or an abstract syntax tree, or a symbol table 828 breakpoint 830 breakpoint range 902 forward step operation, a.k.a. "step forward" or "step" (when default or only direction is forward), meaning step execution forward one source code statement 904 forward step-in operation, a.k.a. "step-in forward" or "step-in" (when default or only direction is forward), meaning step execution forward into a routine, so the next statement to execute will be the first statement of the routine's body 906 forward step-over operation, a.k.a. "step-over forward" or "step-over" (when default or only direction is forward), meaning step execution forward into and through a routine, so the next statement to execute will be the first statement after the call to the routine 908 forward step-out operation, a.k.a. "step-out forward" or "step-out" (when default or only direction is forward), meaning step execution forward through the rest of the current routine, so the next statement to execute will be the first statement after the call to the routine 910 continue forward operation, a.k.a. "continue" or "run" when default or only direction is forward, meaning continue execution forward until a breakpoint is encountered or the process terminates 912 backward step operation, a.k.a. "step backward", meaning step execution backward one source code statement 914 backward step-in operation, a.k.a. "step-in backward", meaning step execution backward into a routine, so the next statement to execute in reverse will be the last statement of the routine's body 916 backward step-over operation, a.k.a. "step-over backward", meaning step execution backward into and through a routine, so the next statement to execute in reverse will be the first statement before the call to the routine 918 backward step-out operation, a.k.a. "step-out backward", meaning step execution backward through the rest of the current routine, so the next statement to execute in reverse will be the first statement before the call to the routine 920 continue backward operation, a.k.a. "backward continue" or "run backward" or "run in reverse", meaning continue execution backward until a breakpoint is encountered or the process start is reached Some implementations may use different definitions for operations 902-920, e.g., by executing more or fewer instructions or by using different names 922 set a breakpoint range, i.e., specify that execution should breakpoint-halt when any address or execution time point in a specified range of multiple addresses or execution time points is encountered 924 set a breakpoint 1004 thread ID 1006 thread status, e.g., created, runnable, running, suspended, blocked, terminated 1008 thread code, namely, code which executed or which may execute when a thread runs 1010 thread memory, e.g., memory which is local to a thread, or memory that is global to the thread and is accessed by the thread as the thread executes 1102 symbol table 1104 identifier used in source code 1106 data type 1108 abstract data tree 1110 intermediate language, e.g., Microsoft Common Intermediate Language, Java® bytecode (mark of Oracle Corporation), register transfer languages, Parrot intermediate representation, Standard Portable Intermediate Representation, LLVM® IR intermediate language (mark of LLVM Foundation Corporation), and others 1112 code in intermediate language 1300 example trace replay execution control method, and flowchart illustrating said method 1302 identify a program 1304 receive an execution control request 1306 use a map between source code and an intermediate representation 1308 use a map between an intermediate representation and a trace 1310 control a reply, e.g., by executing forward or backward or setting parameters (direction, increment) on such execution 1312 perform traced instructions during a replay, e.g., by emulation or by translating the operations specified in the trace into control of a replay of native instructions (which are not necessarily all in the trace)

1314 set a breakpoint or a breakpoint range; includes 922 or 924 or both 1316 send a response to an execution control request 1318 align a group of traced instructions with a source code statement or expression, e.g., by executing up to the edge of the group before breakpoint-halting 1400 flowchart 1402 identify a backward step-out request as such 1404 set a breakpoint at an execution location shortly preceding a specified location; a location A "shortly precedes" a location B in a trace when A is encountered prior to B during forward execution of the trace and there are at most five trace native code instructions between A and B 1406 set a breakpoint at an edge of a group of instructions that corresponds to a particular source code statement or expression 1408 set a breakpoint range that covers (and in some implementations matches) a range of addresses that is designated to receive dynamically compiled ("jitted") code 1410 set a breakpoint to step-over a specified runtime routine 1412 encounter an instruction during original execution or replay execution 1414 exceed a hardware constraint on the maximum number pf simultaneously monitored breakpoints 1416 avoid terminating a program 1418 terminate a program 1420 control original execution or replay execution at a high level, e.g., by specifying execution in terms of which source code statements or expressions to execute 1422 execute (original or replay) a process, thread, or program 1424 get a user selection of a source code statement or expression 1426 a user's selection of a source code statement or expression 1428 debug a process, thread, or program 1430 execute a process, thread, or program forward 1432 execute a process, thread, or program backward 1434 set a large breakpoint range; a breakpoint range is "large" when it covers at least a thousand contiguous addresses or instructions in a trace 1436 large breakpoint range 1438 record trace data from a live process 1440 group traced instructions, that is, create or specify a group 822

1442 clear a breakpoint or a breakpoint range

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, software developers, engineers, and end-users are each a particular type of user 104. Automated agents, scripts, playback software, and the like acting on behalf of one or more people may also be users 104. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The medium 114 is configured with binary instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory. Software processes may be users 104.

In some embodiments, the system includes multiple computers connected by a network 108. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in dashed-line form in the Figures, or listed inside parentheses, to emphasize that they are not necessarily part of the illustrated operating environment or part of all embodiments, but may interoperate with items in the operating environment or some embodiments as discussed herein. It does not follow that items not in dashed-line or parenthetical form are necessarily required, in any Figure or any embodiment. In particular, FIG. 1 is provided for convenience; inclusion of an item in FIG. 1 does not imply that the item, or the described use of the item, was known prior to the current innovations.

Debugging Environments

Figure 2:
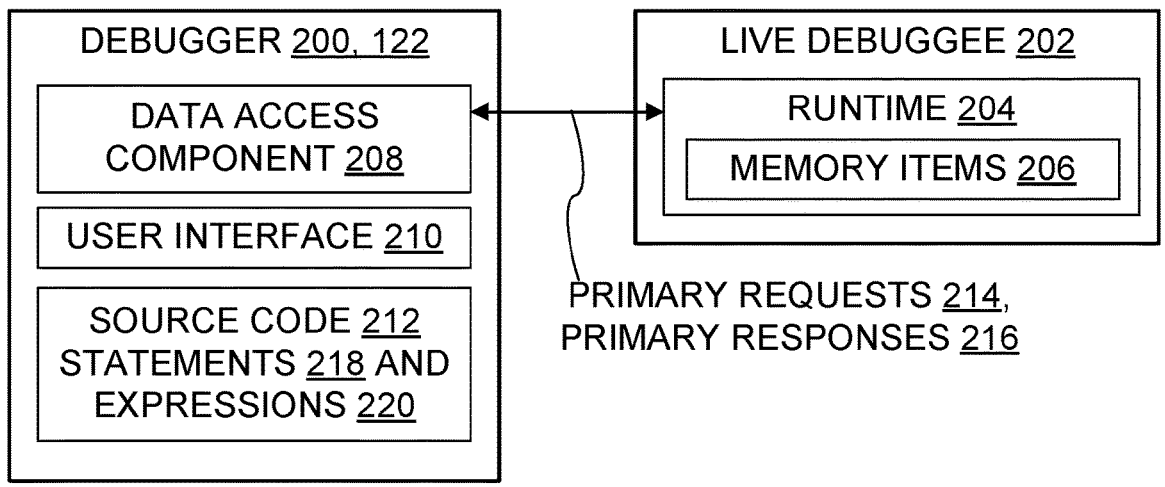
FIG. 2 is a block diagram illustrating aspects of live process debugging.

FIG. 2 illustrates a live process debugging environment, which is an example of operating environment 100. A debugger 200 contains various components, not all of which are shown here, since many are well-known. The main use of execution control as taught herein may be in environments in which live process debugging is not feasible or at least is undesirable. Nonetheless, live process debugging is shown, both for context and because it can be combined with trace-based debugging that utilizes execution control teachings herein.

The debugger 200 may be a conventional debugger, or it may be adapted to perform execution control as taught herein. The illustrated debugger includes a data access component 208 (DAC). In this live debugging 1428 environment, the DAC 208 communicates with a runtime 204 of the debuggee process 202, by using primary requests 214 to the runtime and primary responses 216 from the runtime to obtain state information 206. The debugger then updates its user interface 210 accordingly. The user interface presents state information at a relatively high level, e.g., in terms of artifacts defined in source code 212. However, one of skill will appreciate that a DAC 208 or other adapter is not required for execution control as taught herein.

Figure 3:
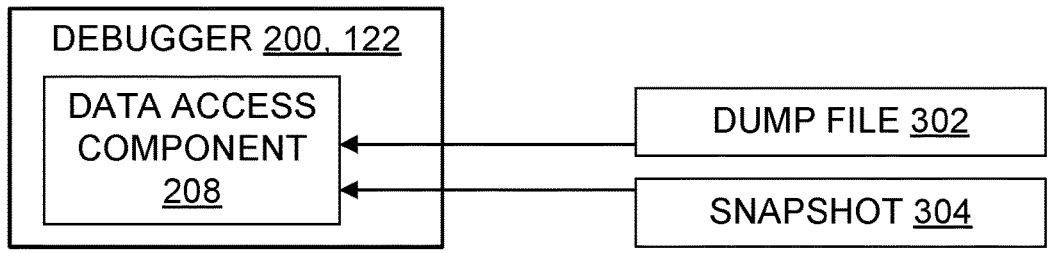
FIG. 3 is a block diagram illustrating aspects of debugging based on a copy of memory that was made at a single particular point in time.

FIG. 3 illustrates a dump debugging environment, which is another example of operating environment 100. A debugger 200 uses its data access component 208 or functionally similar code to read, from a dump file 302 or a snapshot 304 or both, memory contents and other state information for a particular point of time in the execution of a debuggee.

FIG. 4 illustrates a trace-based debugging environment, which is another example of operating environment 100. The illustrated debugger 200 works with, or includes (since the scope of the debugger may be defined, e.g., by a given developer to include a replay adapter 408) technical adaptations which permit the debugger to interact with a trace 418 more or less as if the debugger was instead interacting with a runtime. For example, the same format may be used, in this example, for primary requests 214 and primary responses 216 that was used in the live process debugging environment of FIG. 2. However, trace-based debugging 1428 may provide developers with less flexibility than live process debugging in that variables and other memory contents that are accessible through a runtime are not necessarily readable from a trace. Execution control granularity with a familiar trace-based debugger may also be larger than the granularity available through the teachings provided herein. Finer granularity provides better control during debugging, which may speed bug location identification and understanding of bugs.

Trace-based debugging with suitable execution control 402 code, replay code 406, and mappings 404 between trace data and source code 212 can support reverse execution 1422 in the form of reverse replay of a traced execution. In live debugging, by contrast, a debuggee does not normally execute in reverse.

The illustrated replay adapter 408 includes an interface 410 to the debugger, which in this example presents to the debugger an API that matches at least a subset of the API presented to a conventional debugger by a runtime 204 to support live process debugging 1428. Other implementation approaches are also possible. Moreover, as indicated by the dashed line around the replay adapter 408 in FIG. 4, some or all of the replay adapter may be considered to be part of the debugger 200 in some implementations, in that the debugger is an adapted debugger 200 which contains code utilizing one or more cross-level mappings 404. For instance, one variation implements the primary requests 214 and primary responses 216 and interface 410 as function calls and returns and interfaces within the debugger, as opposed to using external messages. In some variations, the debugger contains and utilizes the cross-level mappings 404, and there is no separate replay adapter 408. The debugger DAC 208 may work to map addresses 448 to high-level objects 512. The debugger cross-level mappings 404 and their associated code (i.e., one or more of the execution controller 402, the replay component 406, and the replay adapter 408) may work to map source code statements 218 or expressions 220 or both, to particular native instructions 434 or groups 822 of native instructions. In some embodiments, the DAC 208 has internal knowledge of the runtime and can read runtime data structures to determine where JITed native code is located for a given set of IL instructions, analogous to dump debugging. The machine architecture the debuggee ran on can be significantly different from the machine the debugger is running on, but the DAC may be designed to read the runtime's data structures and work through hardware/runtime differences.

FIG. 4 shows communication between the replay component 406 and the trace 418 in the form of machine-level requests 414 and responses 416. This is one possible implementation, which as an example may use a trace reader (not shown) to receive and respond to the requests. However, in another implementation the machine-level requests 414 and responses 416 take the form of function calls within the replay adapter 408, which include functions that read from the trace 418 and pass back to their caller information found in the trace, so the replay component can maintain current state information such as what location in the trace 418 is identified by a current instruction pointer 704.

As illustrated, a trace 418 may be stored in one or more files 420, and may include various kinds of trace data as well as metadata which facilitates or delimits searches of the trace data. Part or all of a trace 418 may also reside in RAM. Some examples of trace data include bit-accurate trace data 422 such as copies of low-level instructions and their operands (also referred to as "native instructions"), timecodes 424 which can be used to order trace data items relative to one another, memory snapshots 304 or dumps 302, indexes 430 into the raw trace data, key frames 432 inserted into raw trace data at specified intervals, copies of code 434 executed 1422 by the debuggee during tracing, stack activity 436, data streams 438 read or written by the debuggee while tracing, processor activity on a per-core 440 or per-socket (multiple cores) 442 basis, thread activity 444 while tracing, register reads and writes 446 while tracing, tuples 456 correlating a memory address 448 with an instruction 450 and one or more values 452 and optionally also with a timecode 424, and other 454 reads or writes or values or opcodes captured in a trace. In some embodiments, an instance of any of the items 216, 422, 434, 436, 438, 440, 442, 444, 446, 456 qualifies as a trace "entry" 458. In some, any minimal portion of trace data 454 which by itself represents a state change of the traced program qualifies as a trace "entry" 458. The absence of certain data in a trace may also be considered state information, e.g., gaps 428 in a sequence of timecodes.

Figure 5:
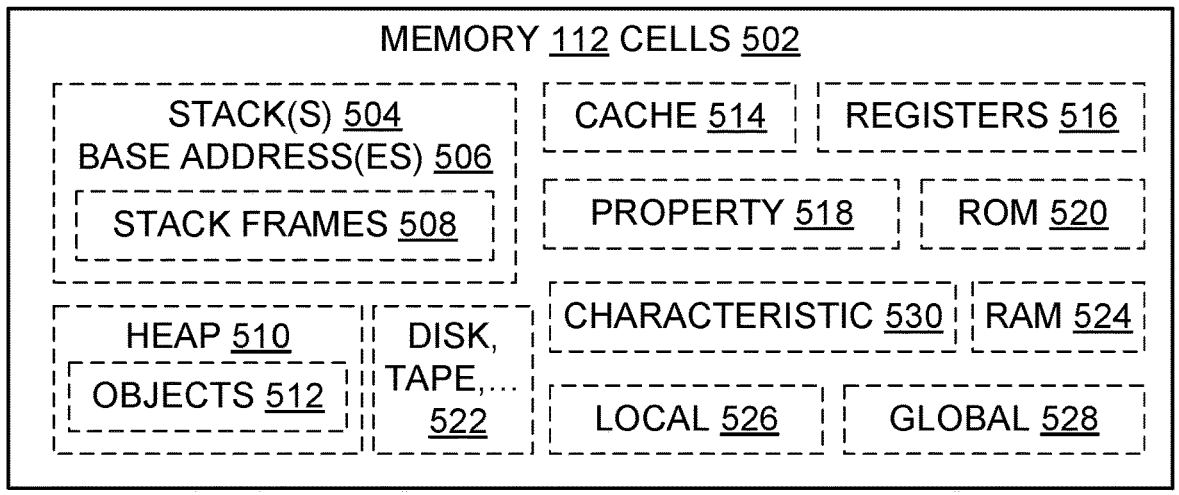
FIG. 5 is a block diagram illustrating various kinds of memory cells that may be referenced during debugging or be referenced in a trace.

FIG. 5 illustrates various kinds of memory 112 that may be traced, and thus be subject to changes in value or allocation status by performance of native instructions under execution 1422 control according to teachings herein. Examples of memory cells 502 shown include stacks 504 (including data such as their base address 506 and allocated stack frames 508), heap contents 510 such as objects 512 or metadata such as garbage collection data, caches 514, processor registers 516, object members such as properties 518, addressable cells in ROM 520 or in RAM 524, removable or third-tier memory 522, local memory 526, and global memory 528. A memory cell may have one or more characteristics 530 which increase or reduce the accessibility of the memory cell, e.g., memory may be in kernel space, may be shared, may be subject to DMA, and so on.

Figure 6:
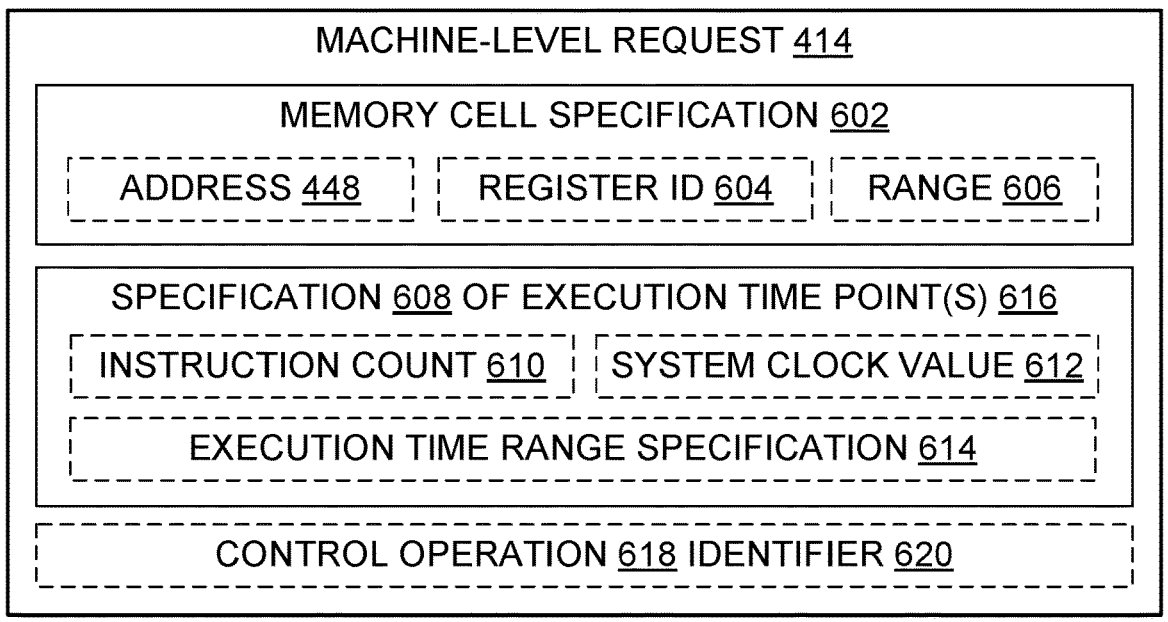
FIG. 6 is a block diagram illustrating machine-level requests that may seek information from an execution trace or exert execution control during replay of the execution trace.

FIG. 6 illustrates content of machine-level requests 414. As noted, these requests may be implemented using communication data structures, or they may be implemented as parameters of routines. Some examples of the content in machine-level requests 414 are memory cell specifications 602 and specifications 608 of one or more execution time points 616. Memory cells 502 may be specified, e.g., as a single address 448, as a range 606 of addresses, or as a register name 604. Timecodes 424 may be specified, e.g., as an instruction count 610, or as a system clock value 612, and the specification may be for a single particular execution time point 616 (a point during the tracing, or a particular native instruction) or for a range of execution time 614 (a.k.a. a span or period or interval of execution 1422 time during the tracing, or a group of contiguous native instructions).

Figure 7:
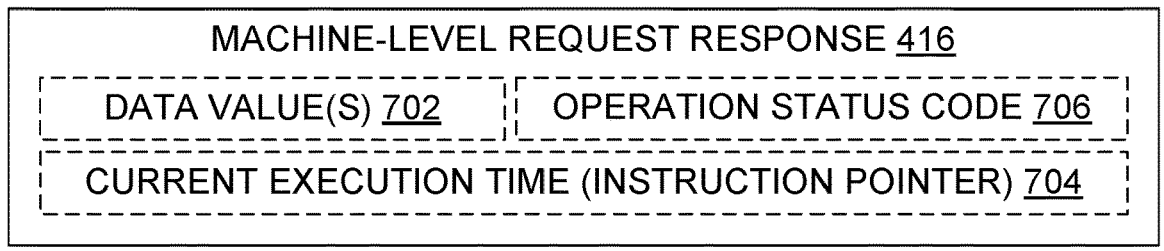
FIG. 7 is a block diagram illustrating responses to machine-level requests.

FIG. 7 illustrates content of machine-level request responses 416. As noted, these request responses may be implemented using communication data structures, or they may be implemented as function return values or side-effects of routines. Some examples of the content in machine-level request responses 416 are values 702 for one or more memory cells specified in the corresponding request 414, an instruction pointer 704 that indicates which instruction will execute next (or which instruction just finished execution 1422), and a status code 706 which contains, e.g., flags associated with an instruction, or errors, or conditions such as end-of-file. Each thread may have a respective instruction pointer 704.

Some Trace Replay Execution Control Systems

Figure 8:
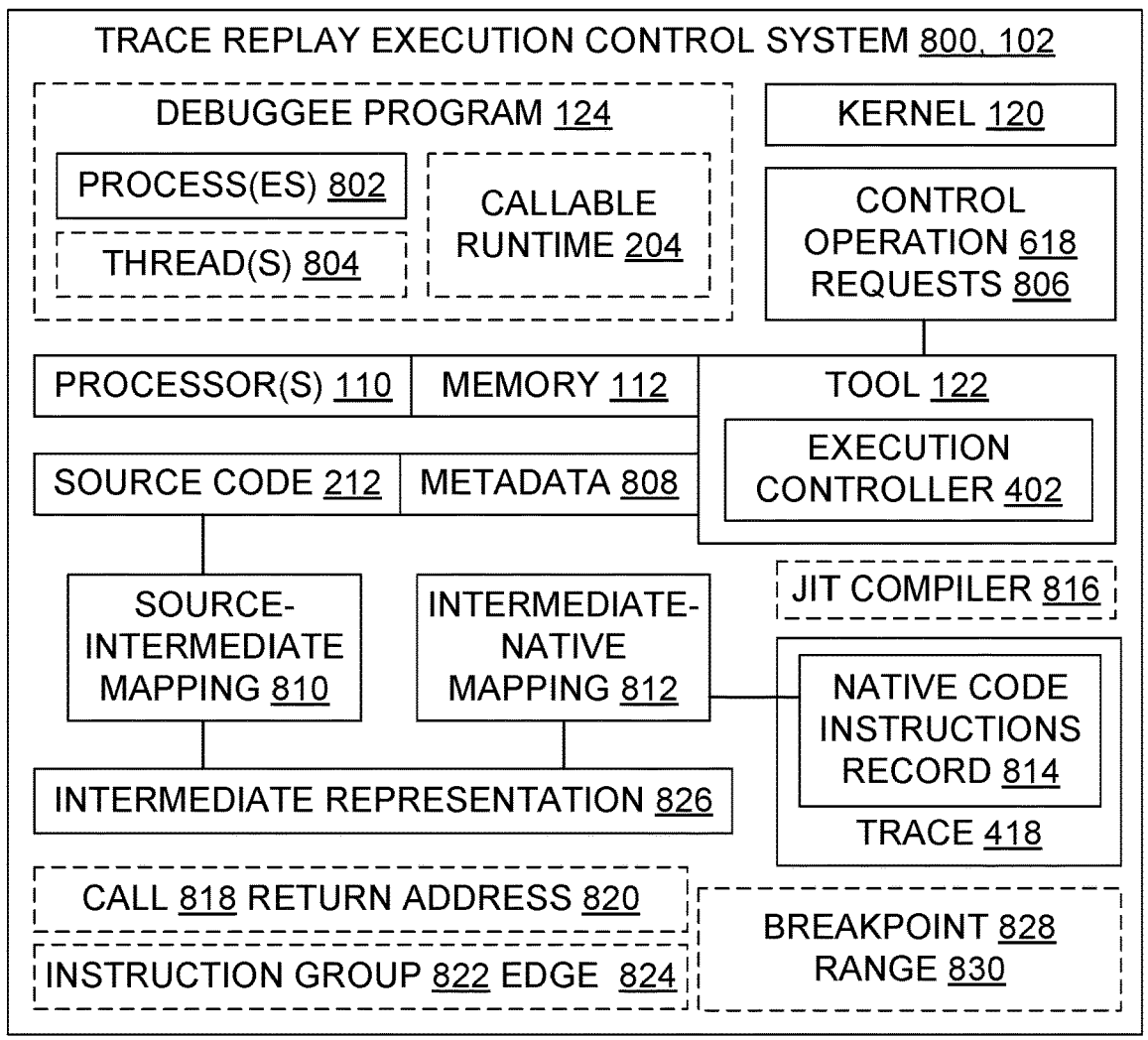
FIG. 8 is a block diagram illustrating an example trace replay execution control system.

FIG. 8 illustrates trace replay execution control systems 800, each of which is a system 102 configured according to execution teachings provided herein. If the execution control system is operating in a live debugging environment, it contains a debuggee program 124 which has a callable runtime 204. Although debugging is used as an example, execution control may also be performed as taught herein in other contexts, e.g., for performance profiling or software health monitoring. The debuggee or other replayed program includes one or more processes 802, each of which may include one or more threads 804. One of skill understands that the terms "process" and "thread" are used in different ways, e.g., sometimes as synonyms of one another and at other times with distinct meanings. Either way, execution control teachings provided herein may be applied because processes 802 and threads 804 have corresponding source code 212 and corresponding traced instructions 434 under either approach to the meaning of "process" and "thread".

Whether the replay execution is occurring in a live debugging environment or not, state information of the replayed program is maintained and updated as the replay execution "proceeds". Proceeding in this sense includes executing forward, executing backward, or both. State information includes, e.g., one or more instruction pointer values indicating execution time point(s) in the trace 418, and traced program variable value changes captured in the trace 418. To indicate the presence of state information, the box for process(es) 802 is shown in solid form, rather than dashed form, in FIG. 8, inside the debuggee program 124 box. However, one of skill will acknowledge that state information could also be maintained inside the execution controller 402 or at one or more other locations in the system 800.

The execution controller 402 itself includes software which is executed using a processor 110 and memory 112. The traced program 124 is other software, which has source code 212 and metadata 808. The execution controller 402 maps between the source code 212 and an intermediate representation 826 of that source code using a source-intermediate mapping 810. The execution controller 402 also maps between the intermediate representation 826 and the trace 418, including a record 814 of native instructions gleaned from the trace, using an intermediate-native mapping 812. These mappings 810, 812 are collectively referred to herein as "cross-level mappings". Note that a given embodiment may include one or more cross-level mappings 404, e.g., the functionality of source-to-intermediate and intermediate-to-native may be integrated into a single source-to-native mapping 404.

In some circumstances, a source-to-IL mapping 810 is created by a compiler, e.g., in the case of .NET languages. However, there are runtimes 204 that execute source language directly; one example of this is JavaScript® (mark of Oracle America, Inc.). In this case, the runtime itself compiles the language into an intermediate format and creates the source-to-IL mapping at the same time. In the case of managed languages like the .NET languages, the high-level language compiler does not do IL-native mapping; instead, the JIT compiler in the runtime 204 does. Compilers that compile to native code also don't do IL-native mapping. In fact, if such a compiler has any form of IL, it's likely an implementation detail of the compiler. In some embodiments, execution control makes use of the IL-native mapping 812 generated by the runtime.

Some implementations obtain from the trace native instructions for the generated IL. For example, some implementations work by emulating the CPU, and use the native instructions to play back the trace. In some cases, the IL alone is not sufficient information to recreate the native instructions. In some, the native instructions themselves are not sufficient to implement IL stepping or IL breakpoints. In addition, the mapping between native instructions and the IL instructions is used. Some embodiments use the mappings without relying on native instructions (which may not even be present in the trace) to implement a debugger that supports stepping through the IL code, using a trace replayer that does not rely on knowing the native instructions. Such an implementation may track the instruction pointer through the ranges provided in the mappings, or through any contiguous or non-contiguous collection of specified items.

An Aside about Cross-Level Mappings

To further illustrate cross-level mappings 404, consider the following example of some source code 212, a portion of some corresponding intermediate language code serving as an intermediate representation 826, and a portion of some native instructions. Only portions of the intermediate language code and the native instructions are shown here, due to patent office restrictions on inclusion of computer code in patent documents, and because showing a portion is sufficient to illustrate the mappings 404 in the context of the other information provided herein and the knowledge of a person of ordinary skill in the art.

Original C # Source Code:

```
public class Sorter
{
    public static void Sort(int[ ] numbersToSort)
    {
        for (int i = 0; i < numbersToSort.Length; i++)
        {
            int insert = numbersToSort[i];
```

```
            int j = i - 1;
            while (j >= 0 && numbersToSort[j] > insert)
            {
                numbersToSort[j + 1] = numbersToSort[j];
                j--;
            }
            numbersToSort[j + 1] = insert;
        }
    }
}
```

Sample Source to IL mapping. This sample was generated by hand; an actual implementation would generally not be humanly readable. That is, a source-to-IL mapping would generally be implemented in a binary format, not a textual format. The material below is nonetheless illustrative of the source-to-IL mapping functionality to one of skill in the art. The mapping is not 1-to-1 and some parts of source lines end up in different places in the IL code. For a single source program, there are many correct generated IL translations.

```
//*** Line 04:              public static void Sort(int[ ] numbersToSort)
.method private hidebysig static void Sort(int32[ ] numbersToSort) cil managed
    .maxstack 4
    .locals init ([0] int32 i,
        [1] int32 insert,
        [2] int32 j,
        [3] bool V_3,
        [4] bool V_4)
//*** Line 05 :             {
    IL_0000:    nop
//*** Line 06:              for (int i = 0; i < numbersToSort.Length; i++)
    IL_0001:    ldc.i4.0
    IL_0002:    stloc.0
    IL_0003:    br.s        IL_003a
//*** Line 07:                  {
    IL_0005:    nop
//*** Line 08:                  int insert = numbersToSort[i];
    IL_0006:    ldarg.0
    IL_0007:    ldloc.0
    IL_0008:    ldelem.i4
    IL_0009:    stloc.1
//*** Line 09:                  int j = i - 1;
    IL_000a:    ldloc.0
    IL_000b:    ldc.i4.1
    IL_000c:    sub
    IL_000d:    stloc.2
//*** Line 10:                  while (j >= 0 && numbersToSort[j] > insert)
    IL_000e:    br.s        IL_001e
//*** Line 11:                  {
    IL_0010:    nop
//*** Line 12 :                 numbersToSort[j + 1] = numbersToSort[j];
    IL_0011:    ldarg.0
    IL_0012:    ldloc.2
    IL_0013:    ldc.14.1
    IL_0014:    add
    IL_0015:    ldarg.0
    IL_0016:    ldloc.2
    IL_0017:    ldelem.i4
    IL_0018:    stelem.i4
//*** Line 13:                  j--;
    IL_0019:    ldloc.2
    IL_001a:    ldc.i4.1
    IL_001b:    sub
    IL_001c:    stloc.2
//*** Line 14:                  }
    IL_001d:    nop
//*** Line 10:                  while (j >= 0 && numbersToSort[j] > insert)
    IL_001e:    ldloc.2
    IL_001f:    ldc.i4.0
    IL_0020:    bit.s       IL_002a
    IL_0022:    ldarg.0
    IL_0023:    ldloc.2
```

Sample IL to native mapping. Like the source to IL mapping, this is hand generated, and an implementation would exist as data structures, e.g., in the runtime. For a single generated IL, there are many correct generated native code translations. Because of the added complexity from processor-specific optimization that a JIT compiler might introduce, and because the debugging 1428 of a program using a trace might not be executing on the same processor type (i.e., different optimizations would apply), one cannot simply run the JIT on the IL and be assured of the same results as were run during the generation of the trace 418. In this example, IL starts with "IL_" and the native is represented as <memory address> <hexadecimal representation of native code> <assembly mnemonic>.

```
IL_0000:            nop
0334093F 90                             nop
    IL_0001:        ldc.i4.0
    IL_0002:        stloc.0
    IL_0003:        br.s        IL_003a
03340940 33 D2                          xor     edx,edx
03340942 89 55 C0                       mov     dword ptr [ebp-40h],edx
03340945 90                             nop
03340946 E9 AD 00 00 00                 jmp     033409F8
    IL_0005:        nop
0334094B 90                             nop
    IL_0006:        ldarg.0
    IL_0007:        ldloc.0
    IL_0008:        ldelem.i4
    IL_0009:        stloc.1
0334094C 8B 45 C0                       mov     eax,dword ptr [ebp-40h]
0334094F 8B 55 C4                       mov     edx,dword ptr [ebp-3Ch]
03340952 3B 42 04                       cmp     eax,dword ptr [edx+4]
03340955 72 05                          jb      0334095C
03340957 E8 84 1E 7A 70                 call    73AE27E0
0334095C 8B 44 82 08                    mov     eax,dword ptr [edx+eax*4+8]
03340960 89 45 BC                       mov     dword ptr [ebp-44h],eax
    IL_000a:        ldloc.0
    IL_000b:        ldc.i4.1
    IL_000c:        sub
    IL_000d:        stloc.2
03340963 8B 45 C0                       mov     eax,dword ptr [ebp-40h]
03340966 48                             dec     eax
03340967 89 45 B8                       mov     dword ptr [ebp-48h],eax
    IL_0010:        nop
0334096A 90                             nop
    IL_000e:        br.s        IL_001e
0334096B EB 34                          jmp     033409A1
    IL_0011:        ldarg.0
    IL_0012:        ldloc.2
    IL_0013:        ldc.i4.1
    IL_0014:        add
    IL_0015:        ldarg.0
    IL_0016:        ldloc.2
    IL_0017:        ldelem.i4
    IL_0018:        stelem.i4
0334096E 8B 45 B8                       mov     eax,dword ptr [ebp-48h]
03340971 8B 55 C4                       mov     edx,dword ptr [ebp-3Ch]
03340974 3B 42 04                       cmp     eax,dword ptr [edx+4]
03340977 72 05                          jb      0334097E
03340979 E8 62 1E 7A 70                 call    73AE27E0
0334097E 8B 44 82 08                    mov     eax,dword ptr [edx+eax*4+8]
03340982 89 45 A8                       mov     dword ptr [ebp-58h],eax
03340985 8B 45 B8                       mov     eax,dword ptr [ebp-48h]
03340988 40                             inc     eax
03340989 8B 55 C4                       mov     edx,dword ptr [ebp-3Ch]
```

```
0334098C  3B 42 04           cmp   eax,dword ptr [edx+4]
0334098F  72 05              jb    03340996
03340991  E8 4A 1E 7A 70     call  73AE27E0
03340996  8B 4D A8           mov   ecx,dword ptr [ebp-58h]
03340999  89 4C 82 08        mov   dword ptr
          [edx+eax*4+8],ecx
```

In general, a kernel 120 is present, and kernel 120 is shown expressly in FIG. 8 to help prevent confusion between a runtime 204 and a kernel 120. Cross-level mappings and execution control as described herein presume that a runtime is present in most if not all configurations when execution was traced to create the trace 418.

Additional Aspects of System 800 and Related Systems

Some embodiments of system 800 include a JIT compiler 816 for dynamically compiling code of the traced program 124. Some aspects of execution control address challenges created by JIT compilation, e.g., by supporting a breakpoint range 830 which allows a breakpoint to be encountered even when the native code that spans the breakpoint's location has not yet been generated by compilation, so long as an address range that will contain the generated code is known. A breakpoint range 830 can be specified as a range 606 or 614, for example, whereas an individual breakpoint 828 is specified as a particular single location in a trace 418.

With continued reference to FIG. 8, some embodiments of system 800 include a return address 820 of a call 818. This may be used, for example, when performing a reverse step-out execution control operation which steps out, in reverse execution, of a called routine.

Some embodiments improve execution control accuracy by providing a more accurate correspondence between source code statements or expressions, on the one hand, and the traced instructions that implement them, on the other hand. Some familiar approaches to trace replay step into the midst of traced instructions that correspond to a given source code statement 218 or expression 220, for example, which can create confusion. Some embodiments described herein affirmatively define a group 822 of traced instructions that corresponds to (e.g., was generated by compilation to implement) a given source code statement 218 or expression 220. Then the execution controller sets the instruction pointer to a location at an edge 824 of the group 822 instead of somewhere in the middle as was previously done. Which edge 824 is chosen may depend on whether execution is replaying forward or backward, e.g., choose the first forward edge for forward replay and the first backward edge for backward replay. Alternatively, the same edge may always be used regardless of replay direction, e.g., always set the instruction pointer at the first forward edge.

Figure 9:
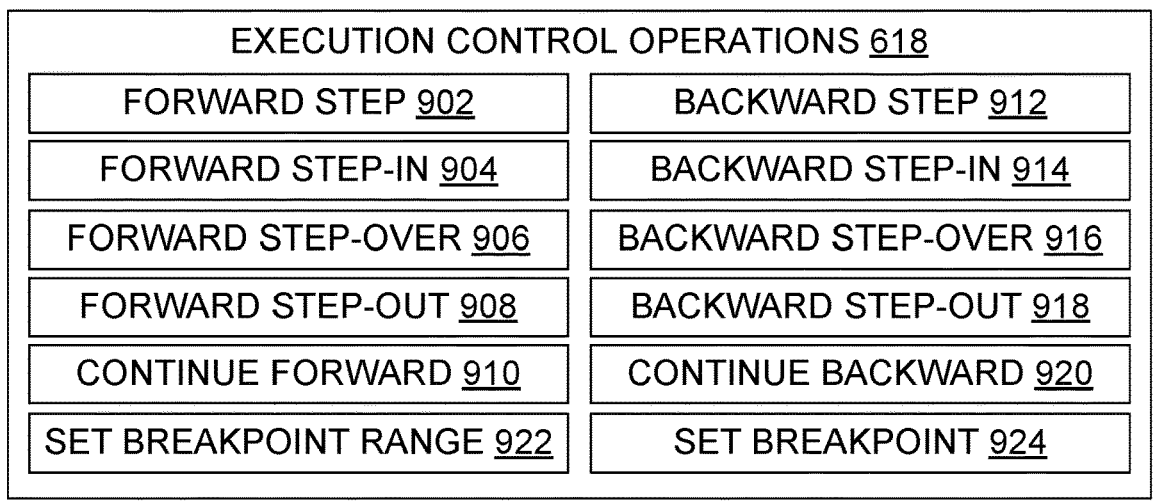
FIG. 9 is a block diagram illustrating some trace replay execution control operations.

FIG. 9 shows several execution control operations 618. Control operation requests 806 are presented to a debugger 200 or other tool 122, e.g., by a user through a debugger interface 210. The execution controller 402 translates the control operation requests 806 into changes in state of a process 802. The illustrated operations include forward step 902, forward step-in 904, forward step-over 906, forward step-out 908, continue forward 910, backward step 912, backward step-in 914, backward step-over 916, backward step-out 918, continue backward 920, set breakpoint range 922, and set breakpoint 924. In these operation names, "forward" denotes forward execution replay and "backward" denotes backward execution replay.

The various step operations 902-920 may be implemented so as to operate, from a developers point of view, similarly or identically with familiar similarly or identically named operations. Internally, however, they may be implemented with innovations for aligning source code to a trace using cross-level mappings 404, instruction groups 822, and particular breakpoint placements, for example. The continue operations 910, 920 may also be implemented so as to operate, from a developers point of view, similarly or identically with familiar continue operations, while internally they utilize cross-level mappings 404 or instruction groups 822 or both. The set breakpoint operation 924 may also be implemented so as to operate, from a developer's point of view, similarly or identically with familiar operations for the developer to set a breakpoint, while internally it utilizes cross-level mappings 404 or instruction groups 822 or both.

Figure 10:
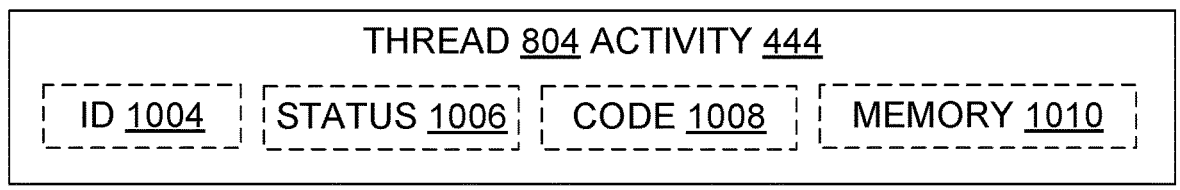
FIG. 10 is a block diagram illustrating some aspects of thread trace data.

FIG. 10 shows thread 804 activity information 444 that may be captured in a given trace 418. Shown are a thread identifier 1004, thread status indication 1006, executable code 1008 of the thread, and memory cell 502 state information 1010 such as thread-local variables and their identifiers.

Figure 11:
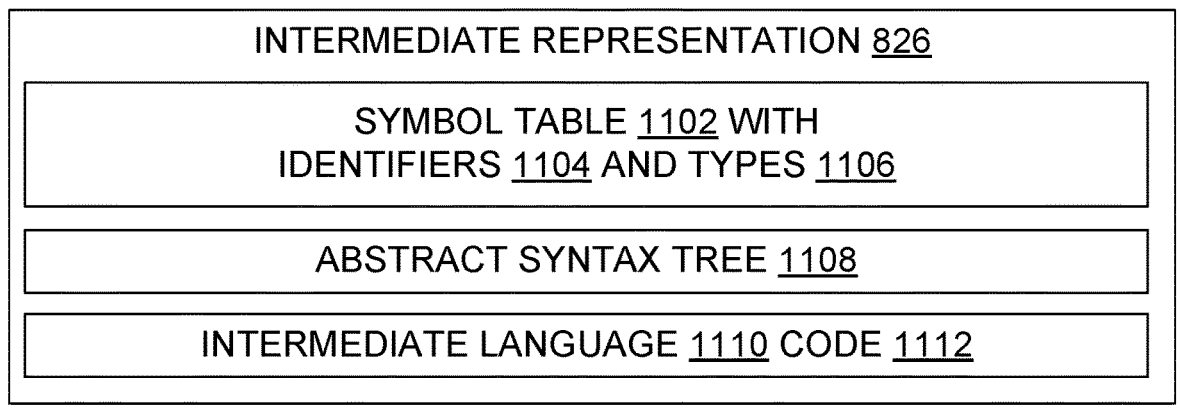
FIG. 11 is a block diagram illustrating some aspects of one or more intermediate representations.

FIG. 11 shows some examples of intermediate representations 826. The illustrated examples include a symbol table 1102, which correlates source code identifiers 1104 (variable names, function names, object member and method names, etc.) with data types 1106 (integer, float, string, Boolean, and user-defined types, for example). Another example is an abstract syntax tree 1108. Other examples include code 1112 written in one or more intermediate languages 1110. More generally, some embodiments use an intermediate representation 826 which shares the structure, or is even a copy of, an intermediate representation created by a compiler. However, the intermediate representation 826 is placed in the context of an execution controller as opposed to the context of the compiler. Also, the intermediate representation 826 is utilized for trace replay of an execution trace 418 of previously generated code, not for generating that code in the first place.

One of skill will acknowledge that a given source code 212 can potentially be used to generate many different versions of corresponding IL. However, only one of these versions will be used in a program and the symbol information emitted by the compiler will correspond to the IL emitted. A debugger may be designed to only load the corresponding symbol information so only one mapping will exist. In some systems, a runtime may include multiple versions of native code for a given routine, e.g., an optimized production version and an non-optimized version of the native code for debugging may both be present, or a multi-tiered JIT functionality may provide multiple versions of the native code in memory. In such multiple-native-version systems, replay may still be done. For example, when a breakpoint is set, it may be set in all existing versions of the native code. Some embodiments use the native code generated by the JIT as well as the IL code, which are obtained from or via the trace 418. Some also use corresponding symbol information for the source/IL mapping which may or may not be contained in the same trace file 420.

Figure 12:
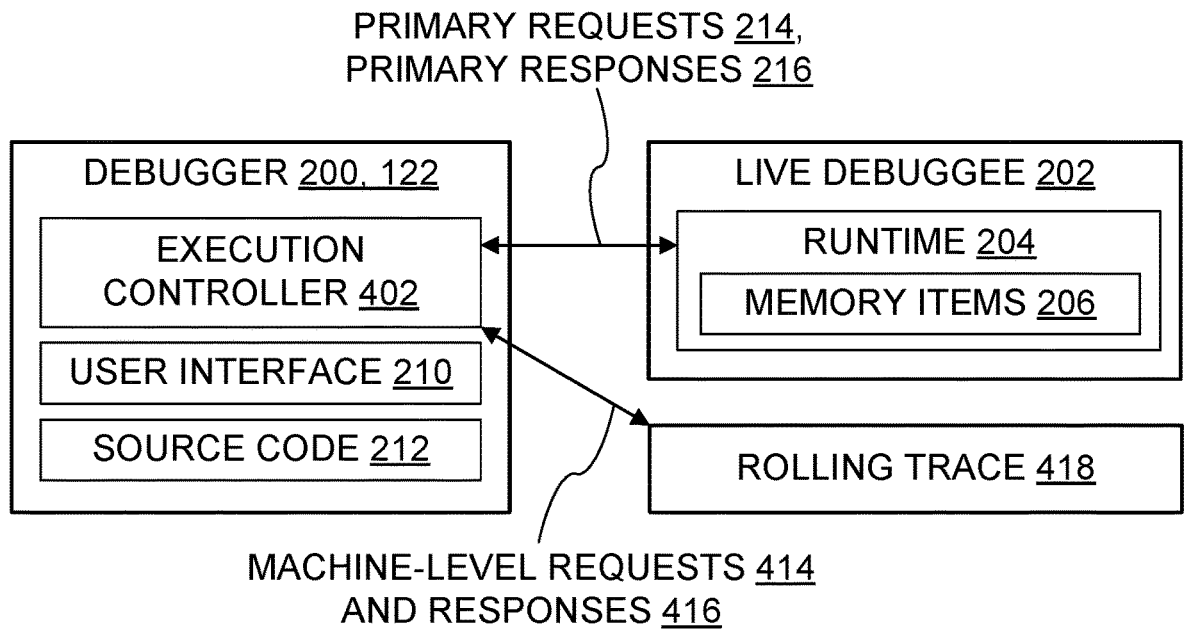
FIG. 12 is a block diagram illustrating some aspects of a live process debugging environment adapted to use a trace which supports reverse execution debugging.

FIG. 12 is a variation on FIG. 2. In the FIG. 12 environment, both live debugging and replay execution are supported. Replay is supported by a rolling trace 418 which records forward execution of the live debuggee on-the-fly while the debuggee executes as prompted by the debugger 200. For efficiency, only the most recent instructions are traced, using, e.g., a pair of buffers. Trace 418 is written to one buffer until it is full, then to the other buffer until it is full, then back into the first buffer (overwriting earlier trace) and so on. Alternatively, instead of a rolling window, all execution activity during the debugging 1428 session could be traced. As another alternative, a previously recorded trace 418 could be accessed during the live debugging session.

Some Additional System Examples

Examples are provided herein to help illustrate aspects of the technology, but the examples given within this document do not describe all of the possible embodiments. Embodiments are not limited to the specific implementations, arrangements, displays, features, approaches, or scenarios provided herein. A given embodiment may include additional or different technical features, mechanisms, sequences, or data structures, for instance, and may otherwise depart from the examples provided herein.

With reference to FIGS. 1-2, some embodiments use or provide a trace replay execution control system 800. The system includes a processor 110, a memory 112 in operable communication with the processor, and a trace 418 recorded during an execution of a program 124 in conjunction with a runtime 204 and a kernel 120. The trace includes a record 814 of native code instructions 116 which executed in at least one thread 804 of the program. A source code 212 of at least a portion of the program is also present.

The system 800 also includes a source-intermediate mapping 810 which maps between the source code and an intermediate representation 826 of the source code, and an intermediate-native mapping 812 which maps between the intermediate representation 826 and the trace 418.

The system 800 also includes an execution controller 402 in a software tool 122. The execution controller is configured to upon execution with the processor control a replay execution of the trace 418 in response to requests 806. In the replay execution, the source code is correlated with the trace native code instructions or other trace entries through the source-intermediate mapping and the intermediate-native mapping.

In some embodiments, the execution controller 402 is configured to translate requests for at least the following operations 618 into corresponding performance of trace native code instructions: a forward execution step-in 904 operation, a forward execution step-out 908 operation, and a forward execution step-over 906 operation.

In some embodiments, the execution controller 402 is configured to translate requests for at least the following operations 618 into corresponding performance of trace native code instructions: a backward execution step-in 914 operation, a backward execution step-out 918 operation, and a backward execution step-over 916 operation.

In some embodiments, the execution controller 402 is configured to translate requests for at least the following operations 618 into corresponding performance of trace native code instructions: continue execution forward 910 through the trace until any location in a breakpoint range 830 is reached, and continue execution backward 920 through the trace until a location in a breakpoint range is reached.

In some embodiments, the system 800 is configured to step into a part of the source code which during the replay execution has not yet been compiled into native code instructions.

In some embodiments, the intermediate representation 826 includes at least one of the following: a symbol table 1102 which correlates at least two identifiers 1104 used in the source code with data types 1106, an abstract syntax tree 1108 derived from at least a portion of the source code, or a translation 1112 into an intermediate language 1110 of at least a portion of the source code 212.

In some embodiments, the trace 418 does not contain any executing instance of the runtime 204, and the system 800 is not configured to call into the trace to execute any code that is specific to the runtime.

In some embodiments, the system 800 includes a live process 202 of the program 124 with a callable instance of the runtime 204. In some, the trace 418 is recorded from the live process and the system is configured to replay execution of the trace.

In some embodiments, the system 800 is configured to skip over replay execution of a portion of the trace 418, in that the execution controller 402 moves the replay execution from a first execution time point of the trace to a second execution time point of the trace without the system performing traced native code instructions or other trace entries that would have been performed by continued execution from the first location to the second location.

One of skill will appreciate that other systems are also within the scope of the teachings presented here. In particular, other systems may perform cross-level mappings 404, use breakpoint ranges 830, and implement other teachings provided herein while departing from the particular examples recited herein. Systems or apparatus using any of the execution control teachings taught here are within the present disclosure, regardless of whether they are among the specific examples provided.

Some Method Examples

Figure 13:
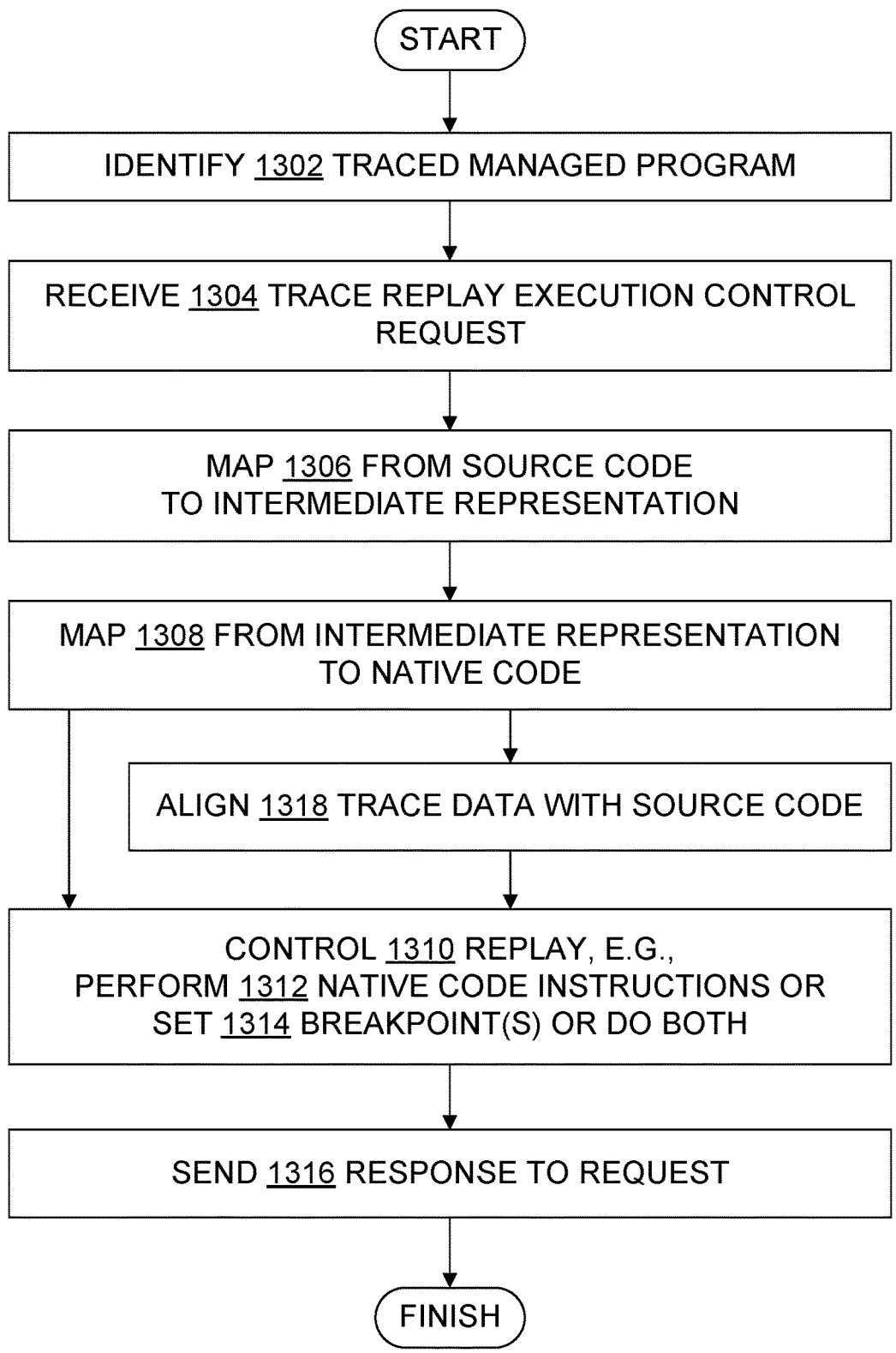
FIG. 13 is a flowchart illustrating an example trace replay execution control method.

FIG. 13 illustrates an execution control method 1300 which is an example of methods performed or assisted by an execution controller 402, cross-level mappings 404, or other items discussed herein. This example method includes identifying 1302 a traced managed program as a traced managed program. Identifying a program as traced is straightforward; if the program is being traced, or was previously traced, then it is a traced program. Identifying a program as managed is somewhat more involved, because a program is managed when it relies on a runtime 204 for live execution and runtimes 204 may provide differing services in different implementations. In many cases, runtimes 204 provide automatic management of heap memory, through garbage collection based on reachability analysis or reference counting or other mechanisms. Of greater interest in the present application, however, is the use of runtimes 204 to execute intermediate language code 1112. In some runtimes, translation from source to native instructions is not modularized into a source-to-intermediate-language phase followed by an intermediate-language-to-native-code phase. For example, some JavaScript® platforms execute source code directly (mark of Oracle America Inc.) For the purposes of this application only, a "managed" program is one that relies on a runtime 204 to produce native instructions. A managed program may also be subject to garbage collection by the runtime, or not.

The illustrated method 1300 also includes receiving 1304 a request for some trace replay execution control operation. The request may be a request 806 directly from a user through a user interface, or a request 214 from a debugger to a trace replay layer component 402, 406, or 408.

The illustrated method 1300 also includes mapping 1306 from source code to an intermediate representation and mapping 1308 from an intermediate representation to native code. This may be done in two phases as indicated, or in other embodiments it may be done in a single combined phase from source code to native instructions. Unlike compilation itself, however, the mapping 1306, 1308, whether in two phases or one, is done not to generate code for execution but instead to correlate source code locations with locations in a trace of previously generated and executed instructions.

Some implementations map 1306 from a source code to an intermediate representation, by using a symbol file that contains a hash, checksum, or other identifier of IL that corresponds to the source. If the identifier corresponds, the debugger will load the symbol file. The symbol file also contains the identifiers of every source file used to compile the IL. Before the debugger will load the source file and map the IL code to the source, it will verify the identifier of the source file with the identifier contained in the symbol file.

Some implementations map 1308 from IL to native code using a mapping that is generated by the runtime when the IL is JITed. In some implementations, a runtime might not promise to retain backwards compatibility on how the JIT will occur, and thus might be free to make changes to the JIT process at any time. In such implementations, a debugger might not be able to make assumptions about what the native code output by the JIT process will contain. Therefore, a debugger may ask the runtime to provide a mapping between the native code and the IL.

Some variations of the illustrated method 1300 include aligning 1318 groups of native instructions with the source code statements or expressions from which those native instructions were generated through compilation.

The illustrated method 1300 includes controlling 1310 a replay, a.k.a. accomplishing "execution control". One example of control 1310 is performing 1312 the native instructions or other trace entries that correspond to the step, step-in, step-over, step-out, or continue operations, thereby altering process 802 state. Another example of control 1310 is setting 1314 individual breakpoints or breakpoint ranges. One of skill will acknowledge that performing step, step-in, step-over, or step-out operations involves setting a breakpoint, but it is also possible to set a breakpoint without performing native instructions or other trace entries, e.g., in preparation for a continue operation. In some embodiments, the code itself is not modified to set breakpoints in a trace. One of skill will recognize that a processor can set execution breakpoints via an instruction (e.g. int3 in some Intel architectures) or via a hardware breakpoint (a register that says which address to monitor). In some embodiments, the replay engine 800 provide similar capabilities. Some implementations do not modify the code stream and support an arbitrarily large number of breakpoints.

Finally, the illustrated method 1300 includes sending 1316 a response to the request, such as a response 416 or another message or data structure containing an instruction pointer 704 or status code 706.

Figure 14:
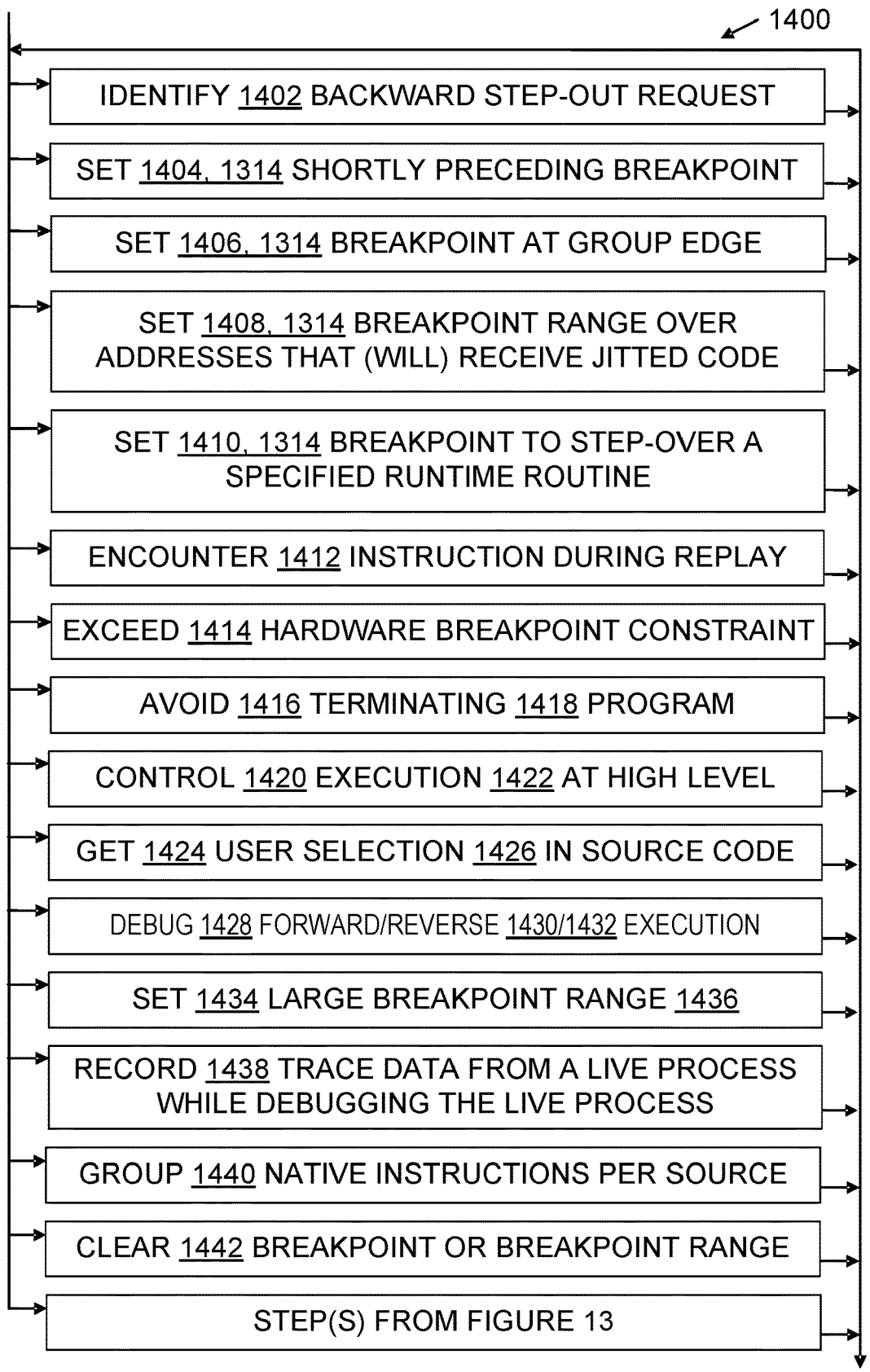
FIG. 14 is a flowchart further illustrating some trace replay execution control methods.

FIG. 14 illustrates some additional execution control steps that may be performed in some embodiments. Some familiar debuggers do not support a backward step-out operation 918. However, some embodiments identify 1402 a request for a backward step-out operation 918, and implement that operation as taught herein.

Debuggers may implement some generally familiar breakpoint operations, that is, operations to set 1314 a breakpoint. However, some embodiments set 1314, 1404 a breakpoint shortly preceding a specified location. Some embodiments set 1314, 1406 a breakpoint at an instruction group edge 824. Some embodiments set 1314, 1408 a breakpoint range 830, e.g., over a range of addresses designated to receive jitted code (code generated by a JIT compiler). In particular, some embodiments set 1434, 1314, 1408 a large breakpoint range 1436, 830. Some embodiments set 1314, 1410 a breakpoint as part of implementing a step-over operation to step over a runtime routine that is likely to hold little interest for a developer. Such runtime routines may perform garbage collection, JIT compilation, anti-malware or other security checks, or runtime 204 housekeeping functions, for example. Other steps shown in FIG. 14 are discussed elsewhere herein, or included for completeness, e.g., breakpoints may not only be set, but may also be cleared 1442.

Technical methods shown in the Figures or otherwise disclosed will be performed automatically, e.g., by a system 800, unless otherwise indicated. Methods may also be performed in part automatically and in part manually to the extent action by a human administrator or other human person is implicated, e.g., a person may select 1426 a source code statement or expression and then request a step operation or a breakpoint operation using a tool 122 user interface. But no method contemplated as innovative herein is entirely manual. In a given embodiment zero or more illustrated steps of a method may be repeated, perhaps with different parameters or data to operate on. Steps in an embodiment may also be done in a different order than shown in the Figures. Steps may be performed serially, in a partially overlapping manner, or fully in parallel. The order in which steps are performed during a given method may vary from one performance of the method to another performance of the method. Steps may also be omitted, combined, renamed, regrouped, or otherwise depart from the illustrated flows, provided that the method performed is operable and conforms to at least one claim.

Some embodiments use or provide a computer-implemented method for trace replay execution control method. One example method includes identifying 1302 a traced managed program, namely, a program which was configured to execute in conjunction with calls into a runtime and configured to be traced. This example also includes receiving 1304 a trace replay execution control request in a software tool running on a computing system. Based on the trace replay execution control request, this example method automatically maps 1306 between a source code of the traced managed program and an intermediate representation of the source code, and automatically maps 1308 between the intermediate representation and a trace 418. The trace includes a record of native code instructions which were traced as the traced managed program executed. The trace 418 does not include any executing instance of the runtime. This example method also performs 1312 trace native code instructions which correspond to the trace replay execution control request, thereby replaying a portion of the trace.

In some embodiments, the trace replay execution control request identifies 1402 a backward execution step-out operation to step out of a routine, and the method includes setting 1314, 1404 a breakpoint on a trace native code instruction which has a location that shortly precedes a location of a return address of a call to the routine. For the purpose of this method, a location A "shortly precedes" a location B in a trace when A is encountered 1412 prior to B during forward execution of the trace and there are at most five trace native code instructions between A and B. For the purpose of this method, when performing source-level debugging, alignment 1318 may correlate an instruction group edge 824 to the most recently executed source file line number, statement, or expression that executed prior to the invocation of the current function. Some embodiments set a breakpoint at a call site of a routine, e.g., some set a breakpoint at the call site of the current function.

In general, the source code contains statements 218 and expressions 220. In some embodiments, the method includes setting 1406, 1314 a breakpoint on a trace native code instruction 116 which is on an edge 824 of a group 822 consisting of all trace native code instructions that are mapped by the method to a given statement or a given expression in the source code. In some implementations the group merely contains all trace native code instructions and may also contain other instructions.

In some embodiments, a received trace replay execution control request 806, 214, 414 names, identifies, or otherwise calls for replay performance according to one of the following: a forward execution step-over 906 operation to step forward over a routine; a backward execution step-over 916 operation to step backward over a routine; a forward execution step-in 904 operation to step forward into a routine; or a backward execution step-in 914 operation to step back into a routine.

In some situations, a received trace replay execution control request 806, 214, 414 names, identifies, or otherwise calls for replay performance according to a forward execution step-in 904 operation to step into a user code routine, and replay execution of the user code routine includes replay execution of at least one call 818 to a runtime 204 routine, and the call to the runtime routine does not have a corresponding call statement or call expression in the source code. In this context some embodiments include at least one of the following: setting 1408 a breakpoint range which specifies an entire memory range that is designated to receive dynamically compiled code, or setting 1410 a breakpoint to perform a step-over operation on the call to the runtime routine.

In some embodiments, a forward step-in 904 operation proceeds as follows. A debugger 200 configured according to the teachings herein maps 1306 a source line range to an intermediate language range, and maps 1308 the intermediate language range to a native range. The debugger then uses low level primitives to perform the step; this may be accomplished using instruction level single steps or breakpoints. When a call 818 instruction is encountered, the debugger determines whether the target is a high level source step representing a step-in at the source level, or instead is a detail of runtime implementation which should not be stepped in because it is not clearly represented in the source code. This determination may be accomplished by querying the runtime, or by searching the source code for the name of the called routine, for example. If the call is to a different high-level (shown in source code) routine, then the debugger queries the runtime 204 (e.g., via DAC 208) to determine whether the called routine has been JIT compiled. If the called routine has been JIT compiled, then the debugger performs a step into 904 the call either using instruction level single step into call, or by setting a breakpoint inside the target routine. If the called routine has not been JIT compiled, then the debugger uses DAC 208 or another mechanism to set a breakpoint on the JIT compiler or on the target address region of JIT compilation write using data breakpoint(s). The debugger allows the trace replay to run until JIT compilation is complete. The debugger sets a breakpoint on the target of JIT compilation and runs. This continues until the native instruction no longer falls within the native stepping range mapped from the initial actions described above, or the program exits. Exceptions are a special case that should land on the target of a catch.

In some embodiments, the trace replay execution control request calls for at least one of the following operations: continue trace replay execution forward 910 through the trace until a breakpoint 828 is reached; continue trace replay execution forward 910 through the trace until a location in a breakpoint range 830 is reached; continue trace replay execution backward 920 through the trace until a breakpoint 828 is reached; or continue trace replay execution backward 920 through the trace until a location in a breakpoint range 830 is reached. Some embodiments further include other operations as potentially being called for in the request, including for instance one or more of the following: a backward execution step-in 914 operation; a backward execution step-out 918 operation; a backward execution step-over 916 operation; a forward execution step-in 904 operation; a forward execution step-out 908 operation; a forward execution step-over 906 operation. More generally, a given embodiment may be limited to any subset of the operations taught herein.

In some cases, during execution of the traced managed program to create the trace 418 a maximum number of breakpoints was constrained by a hardware breakpoint constraint that a processor can monitor at most N addresses at once. However, in some embodiments the method further sets 1314 more than N breakpoints during the replay execution of the trace, thereby exceeding 1414 the hardware breakpoint constraint.

One of skill will appreciate that other methods are also within the scope of the teachings presented here. In particular, other systems may perform cross-level mappings 404, use breakpoint ranges 830, and implement other teachings provided herein while departing from the particular examples recited herein. Methods using any of the execution control teachings taught here are within the present disclosure, regardless of whether they are among the specific examples provided.

Some Configured Media Examples

Some embodiments include a configured computer-readable storage medium 112. Medium 112 may include disks (magnetic, optical, or otherwise), RAM, EEPROMS or other ROMs, and/or other configurable memory, including in particular computer-readable media (which are not mere propagated signals or mere energy). The storage medium which is configured may be in particular a removable storage medium 114 such as a CD, DVD, or flash memory. A general-purpose memory, which may be removable or not, and may be volatile or not, can be configured into an embodiment using items such as an execution controller 402, a replay adapter 408, instruction groups 822, cross-level mappings 404, machine-level requests 414 and responses 416, and breakpoint ranges 830, in the form of data 118 and instructions 116, read from a removable medium 114 and/or another source such as a network connection, to form a configured medium. The configured medium 112 is capable of causing a computer system to perform technical process steps for level-crossing (high-level in tool 122 to low-level in trace 418) replay execution control as disclosed herein. The Figures thus help illustrate configured storage media embodiments and process embodiments, as well as system and process embodiments. In particular, any of the process steps illustrated in FIG. 4, 13, or 14, or otherwise taught herein, may be used to help configure a storage medium to form a configured medium embodiment.

Some embodiments use or provide a computer readable storage medium 112, 114 configured with code which upon execution by a computer processor 110 performs a trace replay execution control method. In this example, the trace replay execution control method includes receiving 1304 a trace replay execution control request in a software tool running on a computing system. Based on the trace replay execution control request, the method includes mapping 1306 between a source code of a traced managed program and an intermediate representation of the source code, and mapping 1308 between the intermediate representation and a trace 418. The trace 418 includes a record of processor activity, such as native code instructions which were traced as the traced managed program executed, in that the trace does not include any executing instance of the runtime. In this example, the trace replay execution control method also includes performing 1312 trace native code instructions or other trace entries which correspond to the trace replay execution control request or setting 1314 a breakpoint on a trace native code instruction, thereby controlling 1310 replay of the trace.

Some embodiments operate in combination with debugger code 200, and in some of these cases the traced managed program includes a live process and an executing runtime 204. The debugger code 200 communicates with the executing runtime 204 of the traced managed program, and the method controls 1310 backward execution replay using the trace 418, without 1416 terminating 1418 the traced managed program. That is, reverse debugging is interleaved with live process debugging in this example.

Some embodiments perform one, or two, or three, or all four of the following activities of particular interest. One particularly interesting activity is controlling 1420 execution of the runtime 204 at a high level using machine-level information in the trace 418. In this context, controlling "at a high level" means controlling based on a user selection 1426 (gotten 1424 through a user interface from a user 104) that specifies an identifier or a statement or expression in the source code. In this context, "machine-level" information means information which is specific to a processor architecture, e.g., a particular instruction set or particular microarchitecture.

Another particularly interesting activity is debugging 200 both forward execution and backward execution of a process 202, 802 of the traced managed program.

Another particularly interesting activity is stepping into a call shown in the source code at least in part by setting 1434 a large breakpoint range 1436. In this context, a breakpoint range is "large" when it covers at least a thousand contiguous addresses or instructions in the trace 418.

Another particularly interesting activity is recording 418 trace data from a live process 202 of the traced managed program while debugging 200 the live process, and then performing reverse execution debugging on the live process using at least some of the recorded trace data.

One of skill will appreciate that other configured medium embodiments are also within the scope of the teachings presented here. In particular, other embodiments may include statutory media configured with code to upon execution perform cross-level mappings 404, use breakpoint ranges 830, and implement other teachings provided herein while departing from the particular examples recited herein. Media configured to perform methods using any of the execution control teachings taught here are within the present disclosure, regardless of whether they are among the specific examples provided.

An Example with JIT Code

Suppose the source code includes a class similar to the class in C # shown below:

```
class Squid
{
    private Leg[8] _legs;
//...
    public void Swim( )
    {
        foreach (Leg leg in _legs)
        {
            WiggleLeg(leg);
        }
    }
    private void WiggleLeg(Leg leg)
    {
//...
    }
}
```

If the language used as C++, a developer would reasonably expect the call in Squid.Swim( ) to WiggleLeg( ) to compile down to something like this (in assembly-like code):

```
CALL 0x0c84fabd ; 0x0c84fabd is the address of
Squid::WiggleLeg( )
```

In this case, 0x0c84fabd would begin the implementation of Squid::WiggleLeg( ). But in managed software, which executes in a runtime 204, things are done differently. The runtime 204 runs code that is 'Just in Time' compiled, a.k.a "jitted". If this is the first time that Squid.WiggleLeg( ) has been called, then there will be no machine instructions 116 for Squid. WiggleLeg. It has not been compiled yet. So, rather than having the machine instructions implementing Squid.WiggleLeg( ), 0x0c84fabd will have some instructions that look like this (in pseudo-code):

```
if (Squid::WiggleLeg_implemenatation == 0)
{
    // potentially long and complicated process
    Squid::WiggleLeg_implementation =
Compile(Squid::WiggleLeg);
}
// Squid::WiggleLeg_implementation is the
// address of the newly compiled (JITTED) code.
GOTO Squid::WiggleLeg_implementation;
```

This little bit of code is called a "pre-stub". The compilation process is long and complicated, so typically a developer trying to analyze or debug an application by tracing the application and using the trace does not want to record the compilation process in detail. However, tracing 418 will likely record at least part of this stub, even though none of those traced instructions are likely to interest the person that is debugging the code. In live process debugging, this part of the code is typically skipped over by the runtime. When debugging only from a trace 418, however, the debuggee's runtime 204 is not executing and therefore not able to skip over pre-stubs. Instead, an embodiment can utilize functionality of out-of-process debugging utilities that would normally be used to read data in dumps 302, and innovative trace replay functionality which can collectively be used to find the address ranges of all JITTED code in the runtime. After receiving a request to step into a method call, an embodiment can temporarily set 1314 breakpoints on the JITTED code ranges, and virtually execute forward (i.e., replay forward) until the first JITTED code range is read. Once it is read, the embodiment can remove the breakpoints. That way, a developer can skip all this uninteresting "stub" code. Some embodiments also optimize this method by targeting the address range of the breakpoint to be just the range of Squid::WiggleLeg_implementation.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

In some embodiments, a trace replay component translates between a trace file 420 location (specified, e.g., by a timecode 424) and a location in source code 212 (specified, e.g., as a line number), using source-IL mapping and IL-machine mapping.

In some embodiments, a portion of runtime functionality is provided in the trace replay component 406. But instead of the runtime mediating between the debugger, user code, and the operating system as it does in a live process per FIG. 2, this runtime functionality mediates between the debugger and the trace file(s) 420.

Some trace recording processes only record two kinds of data. One kind of data recorded is the execution of code instructions 116, which are executed potentially on multiple threads in parallel. The other kind of data recorded is snapshots 304 of specific blocks of memory taken at discrete points in execution time, e.g., to capture a portion of the stack. However, other tracing processes record different or additional kinds of data, as illustrated in FIG. 4. In some cases, a trace contains an efficient representation of all of the recorded instructions plus all of their inputs and their outputs. The recording of a trace 418 is made efficient by relying on the determinism of the processor(s) 110 and recording mainly the information that cannot be inferred based on that determinism plus what is already recorded in the trace 418. The majority of the trace 418 in some implementations is data, not executed code instructions; such data is often non-deterministic. A trace may be mainly seed data plus non-deterministic information. In some cases, only information that enters a cache of the traced processor(s) is recorded into the trace 418, e.g., a read of value V into a processor cache is entered in the trace, but a write of value V from a register of the processor to a memory location X is not necessarily entered into the trace. If that write to X makes a difference in the traced program's behavior, it will be because the written value comes back from X into a processor register at some point, at which point an entry in the trace 418 can be made if tracing is still enabled.

Execution control of a high-level program from a process trace is described herein using examples, illustrations, definitions, and other descriptive material. One of skill will acknowledge that it is possible to create a trace of a process at the machine level using technologies such as Event Tracing for Windows (ETW) tracing or "Time Travel Tracing" on systems running Microsoft Windows® environments (mark of Microsoft Corporation), LTTng® tracing on systems running a Linux® environment (marks of Efficios Inc. and Linus Torvalds, respectively), DTrace® tracing for UNIX®-like environments (marks of Oracle America, Inc. and X/Open Company Ltd. Corp., respectively), and other tracing technologies. The trace can then be replayed using emulation of the hardware. Sometimes this process is written in a high-level language that requires a runtime framework to actually execute the process. An example of this is a .NET application running within the Common Language Runtime (CLR). Moving forward or backward through the trace per se is not helpful for the developer of the high-level program because the trace's view is of the runtime or just-in-time compiled code rather than the high-level program. This document describes a method of mapping the machine level instructions in the trace to the high-level operations in the program. This allows setting and hitting breakpoints as well as forward and reverse stepping in the high-level language.

The process of stepping through code in a high-level runtime can be implemented by abstracting the complexity into three layers. At the lowest layer (layer 0) is a process trace 418. This trace contains sufficient information to allow emulation of the recorded process execution at the hardware level.

At layer 1, a suitably configured system can apply some very basic hardware debugging support for replaying the trace. This support may consist of being able to play the process forwards or backwards, read process memory, read thread context (per thread), set hardware breakpoints, and single step machine instructions per thread.

At layer 2, support is provided for mapping ranges of machine instructions to ranges of high level virtual machine (VM) instructions or another kind of code. Operations in layer 1 can be used to debug the high-level code. In some configurations, the operations to support are run forward, run backward, set breakpoint, step-in, step-out, and step-over. Details regarding implementation of each operation, in an example, are given below.

As to run forward and backward, in this example these are equivalent in the high-level and machine-level runtimes, so this is handled entirely in layer 1.

As to breakpoints, in this example breakpoints are set by using the map defined in layer 2 to map the high-level breakpoint to a hardware breakpoint. When the hardware breakpoint is hit, the implementation can use the mapping to map this hardware breakpoint back to the high-level breakpoint.

As to forward and reverse step-out, by using the stack trace, an implementation can set a hardware breakpoint at the return address of the function. To make reverse step-out work, the breakpoint is set on the instruction before the return address.

As to forward and reverse step-over, step-over can be implemented by looking at the next instruction to execute. Depending on the instruction, the implementation can use layer 1 to either single step or set a breakpoint and run until it is hit. A 'call' instruction is an example of an instruction requiring a breakpoint. Most other instructions can use single step. Unlike some familiar approaches, this example debugger implementation can use the mapping in layer 2 to repeat the stepping operation until the instruction pointer or code execution time point is at an appropriate stopping point in the high-level runtime. This motivates the discussion of instruction groups 822 elsewhere herein.

As to reverse step-in, to perform a reverse step-in this implementation uses the single stepping operation defined in layer 1. If the machine just returned from a call instruction, this use will take the execution time point back to the return instruction of the previous call. If the machine did not just return from a call, the machine will simply step back to the previous instruction. As with step-over, an implementation can use the mapping in layer 2 to know when execution is at a stopping point, and may need to single step several more times to perform alignment 1318 of the trace with the source code.

As to forward step-in, a forward step-in is similar to a reverse step-in this implementation. However, difficulties may occur if the high-level runtime needs to perform work that does not directly pertain to the high-level code that is running. Some examples are just-in-time compilation, runtime housekeeping, and step operations requiring some sort of resolution by the runtime (transparent proxies in .NET are an example of this resolution challenge). Either or both of the following may be implemented to address these difficulties. One option is to set a very large breakpoint range of all of the JIT-ed code when starting a step-in. If this breakpoint is hit after stepping in, the implementation can complete the step upon reaching the next stopping point. Another option is to implement logic in the stepping engine that understands the runtime well enough to know when to step over calls and when to single step through calls, such that the implementation can stop the step at an appropriate point in the high-level runtime.

In some embodiments, out-of-process-execution-control is controlling the execution of IL instructions through the use of functions provided by replay component 406, for example, and an IL-to-address map 812. Functions provided by the replay component 406 or other replay layer components 402, 408 for execution control include:
Get the state of all threads (register values)
Step a single instruction forward or backward
Run forward or backward until the instruction pointer reaches a specified set of addresses.

The IL-to-address map exists in the memory image of the process or trace and the replay layer can provide it to the out-of-process-execution-control debugger. One view is that this example includes translating debugging at the IL level into debugging at the machine level.

Some implementations support applying high-level execution control to a trace using the source-to-IL mapping 810, IL-to-native mapping 812, native-style out-of-process-execution control, and an ability to travel forwards and backwards through the trace 418 by stepping individual instructions, or by running forwards and backwards through the trace until a particular instruction address is reached.

Considering Examples In View of Live Process Debugging

As further illustration of trace-based execution control, consider some of the ways that a particular embodiment may be similar to live debugging or different from live debugging. Several components are referenced below, and one of skill will understand their relationships with the other examples provided herein, and in particular understand that functionalities can be grouped into different components, for understanding or ease of implementation, without necessarily departing from the execution control teachings provided herein. The system 800 components discussed in this example include:
User Interface (UI).

A user interface that displays the debugger's representations of the program state to the user graphically. Examples of program state would be a list of threads, the next line of source code to execute on each thread, a call stack for each thread, a set of variables in each frame of the call stack, the values of those variables, etc.

Source Translation.

A source code translating portion that is responsible for translating between runtime abstractions and source code level abstractions. For example the CLR runtime uses IL instructions encoded in a binary file format to represent code whereas C # source code has a syntax for textual statements. As an example, this layer of the debugger could be translating between the runtime's abstraction layer (as defined, for instance, in Standard ECMA-335. Common Language Infrastructure (CLI) 6th edition (June 2012) or a successor thereof), and the C # abstraction layer (as defined, for instance, in the C # Language Specification version 5.0 or a successor thereof).

Runtime Translation.

A runtime translating portion of the debugger is responsible for translating between low-level concepts such as memory and registers and the runtime abstractions. Examples of runtime abstractions include a list of threads, the callstack for each thread, and the IL instruction that will be executed next. Note that the callstack at the runtime layer of abstraction is not necessarily the same as the callstack at the source code level of abstraction. In the case of live debugging only, to assist in the completion of some tasks, this layer uses an inter-process communication mechanism to request that the runtime within the process being debugged perform work. For example to set a breakpoint at IL instruction in method Foo, offset 28, this layer will send a message to the runtime asking it to set a breakpoint at Foo, offset 28. Then a thread within the runtime will receive that message, translate Foo IL offset 28 into a machine instruction residing at memory address 0x4567123512395, and then write a breakpoint instruction at that location. One may reasonably view the portion of the runtime that services those requests as also residing within this layer of the debugger functionally, even if it is implemented in a different process.

Foundation.

A low level portion of the debugger is responsible for using the kernel, or a dump file, or a trace to produce the memory and registers that will be read by the runtime translating portion. In the case of a kernel process this is achieved in some environments by APIs such as ReadProcessMemory. In the case of a trace file it supports parsing the file and building a mapping between time t and some set of memory and register contents that were recorded at that time.

With these components in mind, consider the case of setting a breakpoint and executing the program forward until it was reached. One view holds that roughly the following actions are involved for live process debugging.

Action 1. User Interface. The user clicks the mouse on a line of source code being displayed to indicate where the breakpoint should be set.

Action 2. Source Translation. The line of source is translated into a particular method and IL instruction offset.

Action 3. Runtime Translation. A message is sent to the runtime, and then within the runtime the method+IL instruction offset is converted to a memory address. Then a breakpoint opcode is written there.

Action 4. User Interface. The user clicks a button in the UI indicating they want the process to run.

Action 5. Source Translation. The request to run is forwarded.

Action 6. Runtime Translation. A message is sent to the runtime 204, requesting that it execute forwards. Upon receiving the message the runtime executes forward and then the breakpoint at a particular memory address set earlier is reached. The memory address of the breakpoint is converted back to a method and IL offset, and a notification message is sent back to the debugger indicating a breakpoint at a specific method/IL offset was reached.

Action 7. Source Translation. The message that the breakpoint was reached is translated from a method and IL offset back into a source line, and a notification that a breakpoint at this source line was hit is sent onwards to the UI.

Action 8. User Interface. The UI requests other information about the new state of the process so that it can display current state information to the user, such as the current callstack for each thread.

Action 9. Source Translation. In order to provide a source abstraction of the callstack, this component first requests to receive the runtime abstraction of the callstack.

Action 10. Runtime Translation. In order to provide the runtime abstraction of the callstack, this component first requests to receive the state of memory and registers.

Action 11. Foundation. The memory and registers at the current time are determined.

Action 12. Runtime Translation. Using the memory and registers, the runtime abstraction of the callstack is calculated.

Action 13. Source Translation. Using the runtime abstraction of the callstack, the source code abstraction of the callstack is calculated.

Action 14. User Interface. Using the source code abstraction of the callstack, the UI can now display the current state of the debugged process to the user.

In some embodiments, when using a trace actions 3, 6, and 11 no longer operate the same way. For Actions 3 and 6 there is no process that can receive messages to set breakpoints, to execute forward, or to send back notifications when breakpoints are reached. For Action 11 there is no process that can be queried with kernel APIs to determine the memory or registers.

Thus, in some embodiments, to implement Action 3 above, Source Translation code asks Runtime Translation code to indicate what memory address X has the machine code for the given method+IL offset where the breakpoint should be set. This address X is saved for later use.

To implement Action 6 above, in some embodiments the Source Translation code directly instructs low-level Foundation portion of the debugger or other tool(s) to advance the trace to new time t', which is the next point in time where the machine instruction at address X would have been simulated or emulated to execute. For Action 6, an embodiment may use the same process that would normally be used in dump debugging to translate from an IL offset to a process memory offset. However, the embodiment uses the translated memory offset to set a virtual breakpoint inside the trace replay engine. When the replay engine reads that memory address during virtual execution, the virtual process (replay execution) stops. Indeed, if the trace contains more than one version of the same function (via re-jitting) Runtime Translation may ask the trace for several addresses to cover a single breakpoint. That could be different addresses for different ranges of time in the trace, and could also be addresses of runtime functions, like the jitting function, in order for Runtime Translation to locate the new re-jitted location of a function.

To implement Action 11 above, instead of reading from a live process, the trace file 418 is read, and memory and registers corresponding to time t' are provided.

A Replay Debugging Scenario

By providing access to both forward and backward execution while debugging, a system 800 can enhance debugging efficiency. For example, some embodiments support debugging scenarios like the following.

By way of context, one of skill will acknowledge that production debugging is difficult. Suppose a customer reports an issue on a website. How does a developer debug it? Some familiar approaches rely on information like logs and dumps, which give only point-in-time information. So, if the problem didn't reproduce or occur at the particular moment captured in a log or dump, the developer has to try again to capture helpful information at a different point in the execution, which means spending a longer time to fix the issue.

Imagine instead that an environment could tell the developer exactly what happened in the application in production, line by line. Embodiments that use Microsoft Time Travel Debugging or other reverse execution replay allow a team member to collect a high fidelity recording of the application's behavior. Then the developer can debug the application offline in a generally familiar environment such as a Microsoft Visual Studio® environment or other debugging or integrated development environment.

As a specific example, suppose a problem occurs with a SmartHotels360 website; this is a demo website whose code is available publicly from Microsoft Corporation through the GitHub dot com site. A developer at a company running this SmartHotels360 site gets a report from a user that a feature to show the Best Hotels is no longer showing data. It was working fine before though, and the problem didn't reproduce in the company's test or staging environments. A member of the ops team or engineering team has collected a recording (trace 418) of the application when it ran the code that powers the faulty feature. The trace 418 may be collected into a file 420 by way of a command line tool, or recording may be triggered automatically by a cloud environment (Microsoft Azure® or another cloud environment) when some condition is met, such as a method throwing more exceptions than expected.

The developer opens the debugger and loads the SmartHotels360 code and the trace file 420. Execution is stopped at a breakpoint at Line 28 in an API that returns the Best Hotels. Now, even though this is a recording file, in this example the developer can navigate it with the debugger the developer is generally familiar with, using many familiar commands. The developer wants to know what happened when this API was called. The developer steps execution over Lines 28 and 29, and sees from a Locals Window that after stepping over Line 29, bestHotels has zero items. If the debugger supports data tips, the developer may view them also, at least in this example.

Now the developer has determined that the cause of the issue is in a BestHotels( ) routine. So the developer wants to investigate what happened in BestHotels( ). In a different approach to debugging, in order to go back to see what happened, the developer might hit continue, hit the breakpoint again, and step into the next invocation of BestHotels( ) although values, objects, and memory addresses may differ there from the partially-debugged invocation. Or when the debugger state is hard to reproduce, the developer might restart the application, which can take a lot of time. But in this example, the environment supports time travel debugging. So the developer uses a Reverse Continue button (requesting a continue backward 920 operation) to rewind the application to the state at the previous breakpoint. One result of the rewind is that the locals will reset to their previous state at Line 28, before the stepping noted above. Now the developer can step over a Load( ) routine and step into BestHotels( ) with the assurance that all values, objects, and memory addresses from the partially-debugged invocation will be identical.

At this point, the developer decides to step through BestHotels( ) and to drill into GetBestHotels( ). So the developer wants to step over Line 36, and step into Line 37. Suppose the developer accidentally presses a step over button too many times. With time travel debugging, the developer can quickly go back and see what happened in GetBestHotels( ). In fact, the developer can use a Step Back Into button (requesting a backward step-in 914 operation), which will take the execution into GetBestHotels( ) playing it backward. The developer discovers that, at the end of GetBestHotels( ) the local variable bestHotels has a value (corresponding to a count) of zero. Apparently somehow all the ratings are being filtered out.

So the developer decides to test a hypothesis, by checking to see what the ratings of all the hotels were. Remember, this trace is what happened in production, so these values are actual values. The developer can use a debuggers Immediate Window to evaluate an expression, as is possible with live debugging of a process. The developer evaluates the expression "AllHotels.Select(h=>h.rating)" in the debugger's Immediate Window, and discovers that the ratings are floats, while the code is checking for rating values that are equal to the integers 4 or 5. There was a data type mismatch, a mismatch between the shape of the data in production and what the application was expecting.

Now suppose the developer has done the debugging just described, and wants to discuss it with a colleague and show the colleague in detail what occurred. The developer wants to start again at the beginning of the investigation, and wants a way to quickly get back to particular points of interest. So the developer sets a breakpoint at Line 21, and rewinds to it. Then the replay will allow the developer to reproduce the debugging steps all over again. If the developer wants to skip to the end, the developer can forward continue to keep going until the last breakpoint the developer set.

In short, the developer was able to quickly debug a problem using a high fidelity recording 418 of the application, which captured what actually went wrong in production. With the power of a debugger that is adapted for replay as taught herein, the developer was able to debug using a familiar debugger user interface, and was able to debug both forward and backward, saving significant developer time.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 13 and 14 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus do not necessarily appear in every embodiment. Those of skill will also understand that program identifiers and some other terminology used in discussing details are implementation-specific and thus do not necessarily pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures is necessarily present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications would not necessarily encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A trace replay execution control system, comprising:
   a processor;
   a memory in operable communication with the processor;
   a trace recorded during an execution of a program in conjunction with calls into a runtime of the program and a kernel, wherein the trace includes trace entries which include a record of activities of native code instructions which executed in at least one thread of the program, wherein the activities of the native code instructions are traced as the program is executed, and wherein the trace does not include any executing instance of the runtime of the program;
   a source code of at least a portion of the program;
   a source-intermediate mapping which automatically maps between the source code of at least the portion of the program and an intermediate representation of the source code of at least the portion of the program;
   an intermediate-native mapping which automatically maps between the intermediate representation of the source code of at least the portion of the program and the trace; and
   an execution controller in a software tool, wherein the execution controller is configured to, upon execution by the processor, control a replay execution of the trace in response to receiving trace replay execution control requests, in which the source code is correlated with the trace entries through the source-intermediate mapping and the intermediate-native mapping.

2. The trace replay execution control system of claim 1, wherein the execution controller is further configured to translate requests for at least the following operations into corresponding performance of trace native code instructions:
   a forward execution step-in operation;
   a forward execution step-out operation; and
   a forward execution step-over operation.

3. The trace replay execution control system of claim 1, wherein the execution controller is further configured to translate requests for at least the following operations into corresponding performance of trace native code instructions:
   a backward execution step-in operation;
   a backward execution step-out operation; and
   a backward execution step-over operation.

4. The trace replay execution control system of claim 1, wherein the execution controller is further configured to translate requests for at least the following operations into corresponding performance of trace native code instructions:
   continue execution forward through the trace until a location in a breakpoint range is reached; and
   continue execution backward through the trace until a location in a breakpoint range is reached.

5. The trace replay execution control system of claim 1, wherein the trace replay execution control system is configured to step into a part of the source code of at least the portion of the program which during the replay execution of the trace has not yet been compiled into native code instructions.

6. The trace replay execution control system of claim 1, wherein the intermediate representation of the source code of at least the portion of the program comprises at least one of the following:
   a symbol table which correlates at least two identifiers used in the source code of at least the portion of the program with data types;
   an abstract syntax tree derived from at least a portion of the source code of at least the portion of the program; or
   a translation into an intermediate language of at least a portion of the source code of at least the portion of the program.

7. The trace replay execution control system of claim 1, wherein the trace does not contain any executing instance of the runtime of the program, in that the trace replay execution control system is not configured to call into the trace to execute any code that is specific to the runtime of the program.

8. The trace replay execution control system of claim 1, further comprising a live process of the program with a callable instance of the runtime of the program, wherein the trace is recorded from the live process of the program and the trace replay execution control system is configured to replay execution of the trace recorded from the live process of the program.

9. The trace replay execution control system of claim 1, wherein the trace replay execution control system is configured to skip over replay execution of a portion of the trace, in that the execution controller moves the replay execution of the portion of the trace from a first execution time point of the trace to a second execution time point of the trace without the trace replay execution control system performing trace native code instructions that would have been performed by continued execution from the first execution time point of the trace to the second execution time point of the trace.

10. A trace replay execution control method, comprising:
    identifying a traced managed program which is configured to execute in conjunction with calls into a runtime of the traced managed program and a kernel and configured to be traced during the execution;
    receiving a trace replay execution control request, wherein the trace replay execution control request is received in a software tool running on a computing system;
    based on receiving the trace replay execution control request, automatically mapping between a source code of the traced managed program and an intermediate representation of the source code of the traced managed program, and automatically mapping between the intermediate representation of the source code of the traced managed program and a trace recorded during the execution of the traced managed program, wherein the trace includes trace entries which include a record of activities of native code instructions which executed in at least one thread of the traced managed program by at least one processor, wherein the activities of the native code instructions are traced as the traced managed program is executed, and wherein the trace does not include any executing instance of the runtime of the traced managed program; and performing trace native code instructions which correspond to the trace replay execution control request, in which the source code is correlated with the trace entries through the source-intermediate mapping and the intermediate-native mapping, thereby replaying execution of a portion of the trace.

11. The trace replay execution control method of claim 10, wherein the trace replay execution control request identifies a backward execution step-out operation to step out of a routine, and the trace replay execution control method further comprises setting a breakpoint on a trace native code instruction which has a location that shortly precedes a location of a return address of a call to the routine, and wherein a location A shortly precedes a location B in a trace when A is encountered prior to B during a forward execution of the trace and there are at most five trace native code instructions between A and B.

12. The trace replay execution control method of claim 10, wherein the source code of the traced managed program contains statements and expressions, wherein the trace replay execution control method further comprises setting a breakpoint on a trace native code instruction which is on an edge of a group of all trace native code instructions that are mapped by the trace replay execution control method to a given statement or a given expression in the source code of the traced managed program, and wherein an instruction X of a group of instructions G in a trace is on an edge of G when X satisfies at least one of the following conditions:
X is the first instruction of G encountered during forward execution of the trace;
X is the last instruction of G encountered during forward execution of the trace;
X is the first instruction of G encountered during backward execution of the trace; or
X is the last instruction of G encountered during backward execution of the trace.

13. The trace replay execution control method of claim 12, wherein the trace replay execution control request calls for one of the following:
a forward execution step-over operation to step forward over a routine;
a backward execution step-over operation to step backward over a routine;
a forward execution step-in operation to step forward into a routine; or
a backward execution step-in operation to step backward into a routine.

14. The trace replay execution control method of claim 10, wherein the trace replay execution control request identifies a forward execution step-in operation to step into a user code routine, wherein replay execution of the user code routine includes replay execution of at least one call to a runtime routine, wherein the at least one call to the runtime routine does not have a corresponding call statement or call expression in the source code of the traced managed program, and wherein the trace replay execution control method further comprises at least one of the following:
setting a breakpoint range which specifies an entire memory range that is designated to receive dynamically compiled code; or
setting a breakpoint to perform a step-over operation on the at least one call to the runtime routine.

15. The trace replay execution control method of claim 10, wherein the trace replay execution control request calls for at least one of the following operations:
continue trace replay execution forward through the trace until a breakpoint is reached;
continue trace replay execution forward through the trace until a location in a breakpoint range is reached;
continue trace replay execution backward through the trace until a breakpoint is reached;
continue trace replay execution backward through the trace until a location in a breakpoint range is reached;
a backward execution step-in operation;
a backward execution step-out operation;
a backward execution step-over operation;
a forward execution step-in operation;
a forward execution step-out operation; or
a forward execution step-over operation.

16. The trace replay execution control method of claim 10, wherein during the execution of the traced managed program, a maximum number of breakpoints was constrained by a hardware breakpoint constraint that a processor can monitor at most N addresses at once, and wherein the trace replay execution control method further comprises setting more than N breakpoints during the replay execution of the portion of the trace, thereby exceeding the hardware breakpoint constraint.

17. A computer-readable storage medium stored with data and instructions to perform, upon execution by a processor in operable communication with a memory, a trace replay execution control method, the trace replay execution control method comprising:
identifying a traced managed program which is configured to execute in conjunction with calls into a runtime of the traced managed program and a kernel and configured to be traced during the execution;
receiving a trace replay execution control request, wherein the trace replay execution control request is received in a software tool running on a computing system;
based on receiving the trace replay execution control request, automatically mapping between a source code of the traced managed program and an intermediate representation of the source code of the traced managed program, and automatically mapping between the intermediate representation of the source code of the traced managed program and a trace recorded during the execution of the traced managed program, wherein the trace includes trace entries which include a record of activities of native code instructions which executed in at least one thread of the traced managed program by at least one processor, wherein the activities of the native code instructions are traced as the traced managed program executed, and wherein the trace does not include any executing instance of the runtime of the traced managed program; and
performing trace native code instructions which correspond to the trace replay execution control request or setting a breakpoint on a trace native code instruction, in which the source code is correlated with the trace entries through the source-intermediate mapping and the intermediate-native mapping, thereby controlling replay execution of the trace.

18. The computer-readable storage medium of claim 17, wherein the traced managed program, in combination with a debugger code, includes a live process and an executing runtime of the traced managed program, and wherein the debugger code communicates with the executing runtime of the traced managed program, and the trace replay execution control method further comprises controlling backward execution replay using the trace without terminating the traced managed program.

19. The computer-readable storage medium of claim 17, wherein the trace replay execution control method further comprises at least two of the following execution control activities:
- controlling an execution of the runtime of the traced managed program at a high level using machine-level information in the trace, where controlling the execution of the runtime of the traced managed program at a high level means controlling based on a user selection that specifies an identifier or a statement or an expression in the source code of the traced managed program, and machine-level information in the trace means information which is specific to a processor architecture;
- debugging both forward execution and backward execution of a process of the traced managed program;
- stepping into a call shown in the source code of the traced managed program at least in part by setting a large breakpoint range, where a breakpoint range is large when it covers at least a thousand contiguous addresses or instructions in the trace;
- mapping to a particular version of native code of a routine when the trace includes at least two versions of native code of the routine; or
- recording trace data from a live process of the traced managed program while debugging the live process, and then performing reverse execution debugging on the live process using at least some of the recorded trace data.

20. The computer-readable storage medium of claim 17, wherein the trace replay execution control method further comprises at least three of the following execution control activities:
- controlling an execution of the runtime of the traced managed program at a high level using machine-level information in the trace, where controlling the execution of the runtime of the traced managed program at a high level means controlling based on a user selection that specifies an identifier or a statement or an expression in the source code of the traced managed program, and machine-level information in the trace means information which is specific to a processor architecture;
- debugging both forward execution and backward execution of a process of the traced managed program;
- stepping into a call shown in the source code of the traced managed program at least in part by setting a large breakpoint range, where a breakpoint range is large when it covers at least a thousand contiguous addresses or instructions in the trace;
- mapping to a particular version of native code of a routine when the trace includes at least two versions of native code of the routine; or
- recording trace data from a live process of the traced managed program while debugging the live process, and then performing reverse execution debugging on the live process using at least some of the recorded trace data.

* * * * *